United States Patent
Nemoto

(10) Patent No.: US 8,079,446 B2
(45) Date of Patent: Dec. 20, 2011

(54) OPERATIONAL MECHANISM FOR MOVABLE BODY

(75) Inventor: Takehiko Nemoto, Nagoya (JP)

(73) Assignee: NIFCO Inc., Yokohama-Shi (JP)

( * ) Notice: Subject to any disclaimer, the term of this patent is extended or adjusted under 35 U.S.C. 154(b) by 493 days.

(21) Appl. No.: 12/244,389

(22) Filed: Oct. 2, 2008

(65) Prior Publication Data
US 2010/0077571 A1 Apr. 1, 2010

(30) Foreign Application Priority Data
Sep. 30, 2008 (JP) ................................ 2008-253324

(51) Int. Cl.
F03G 1/00 (2006.01)
A41D 27/22 (2006.01)
E04G 3/00 (2006.01)
F16B 45/00 (2006.01)
F16H 31/00 (2006.01)
B60R 7/10 (2006.01)

(52) U.S. Cl. ..... 185/40 H; 185/45; 223/89; 248/292.12; 248/292.13; 248/304; 74/141; 224/313

(58) Field of Classification Search ............... 185/9, 37, 185/40 H, 45; 248/308, 314, 691, 692, 292.12, 248/292.13, 304; 296/1.07; 223/85, 88, 223/89, 92, 94; 224/313, 553, 927; 74/136, 74/137, 141
See application file for complete search history.

(56) References Cited

U.S. PATENT DOCUMENTS

| 4,221,354 | A | * | 9/1980 | Kempkers | ................ | 248/291.1 |
| 4,688,695 | A | * | 8/1987 | Hirohata | .................. | 49/364 |
| 6,422,524 | B1 | * | 7/2002 | Spagnuolo et al. | ........... | 248/307 |
| 6,662,405 | B2 | * | 12/2003 | Vitry | ............................... | 16/355 |
| 6,663,067 | B2 | * | 12/2003 | Gordon | ..................... | 248/294.1 |
| 6,935,601 | B2 | * | 8/2005 | Tanaka | ...................... | 248/294.1 |
| 6,968,601 | B2 | * | 11/2005 | Bivens et al. | .................. | 24/369 |

(Continued)

FOREIGN PATENT DOCUMENTS
JP U 3-86853 9/1991

(Continued)

OTHER PUBLICATIONS

International Search Report issued in corresponding International Application No. PCT/JP2009/067101, mailed Nov. 17, 2009.

Primary Examiner — Justin Krause
Assistant Examiner — Adam D Rogers
(74) Attorney, Agent, or Firm — Oliff & Berridge, PLC

(57) ABSTRACT

The invention provides an operational mechanism for a movable body in which, after a movable body is in an opened state, the movable body can return to a closed position, including a movable body rotatably attached to a support and rotatable between an engaged position, a closed position, and an open position; a rotating member rotatably attached to the support, that rotates due to movement of the movable body to the engaged position; a biasing member, one end of which is attached to the movable body, and the other end of which is attached to the rotating member; and an operation member, which rotates the rotating member, changes the biasing position of the biasing member with respect to the center of rotation of the movable body, and generates in the biasing member a rotational force that moves the movable body to the closed position or the open position.

18 Claims, 16 Drawing Sheets

U.S. PATENT DOCUMENTS

| | | | |
|---|---|---|---|
| 7,240,398 B2* | 7/2007 | Watanabe et al. | 16/51 |
| 7,374,220 B2* | 5/2008 | Ichimaru | 296/37.1 |
| 7,451,888 B2* | 11/2008 | Tanaka | 220/263 |
| 7,669,821 B2* | 3/2010 | Martin | 248/294.1 |
| 2001/0010175 A1* | 8/2001 | Dietrich et al. | 74/89.18 |
| 2005/0133507 A1* | 6/2005 | Tanaka | 220/263 |
| 2005/0252759 A1* | 11/2005 | Ichimaru | 200/523 |
| 2006/0265864 A1* | 11/2006 | Fukuo | 29/700 |
| 2007/0034636 A1* | 2/2007 | Fukuo | 220/830 |
| 2009/0250579 A1* | 10/2009 | Nishida et al. | 248/308 |

FOREIGN PATENT DOCUMENTS

| | | |
|---|---|---|
| JP | U 7-17655 | 3/1995 |
| JP | U 7-37812 | 7/1995 |
| JP | A 2003-127744 | 5/2003 |
| JP | A 2004-183736 | 7/2004 |
| JP | A-2006-035994 | 2/2006 |
| JP | A-2006-193883 | 7/2006 |
| JP | A 2008-029367 | 2/2008 |
| JP | U 3142083 | 6/2008 |

* cited by examiner

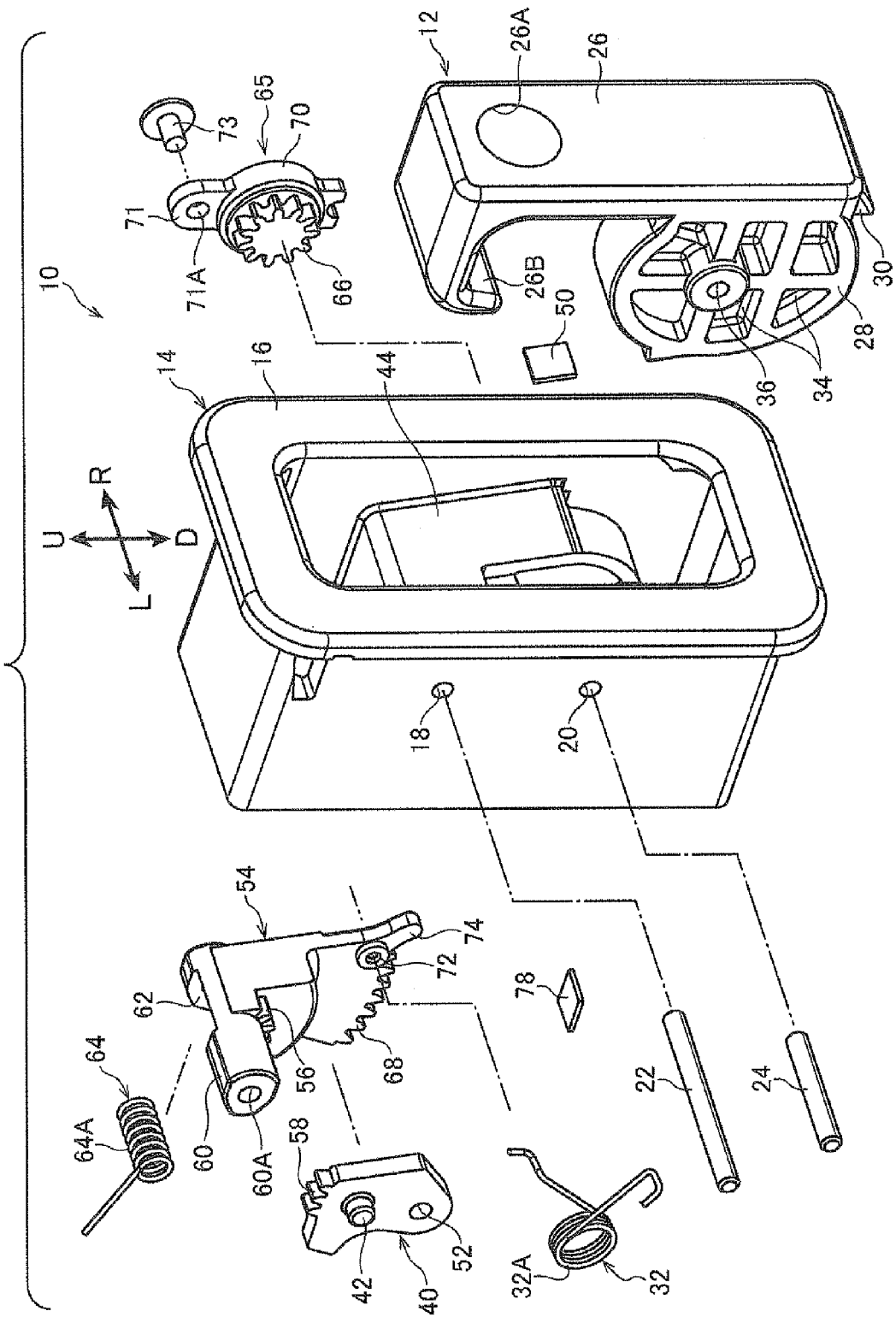

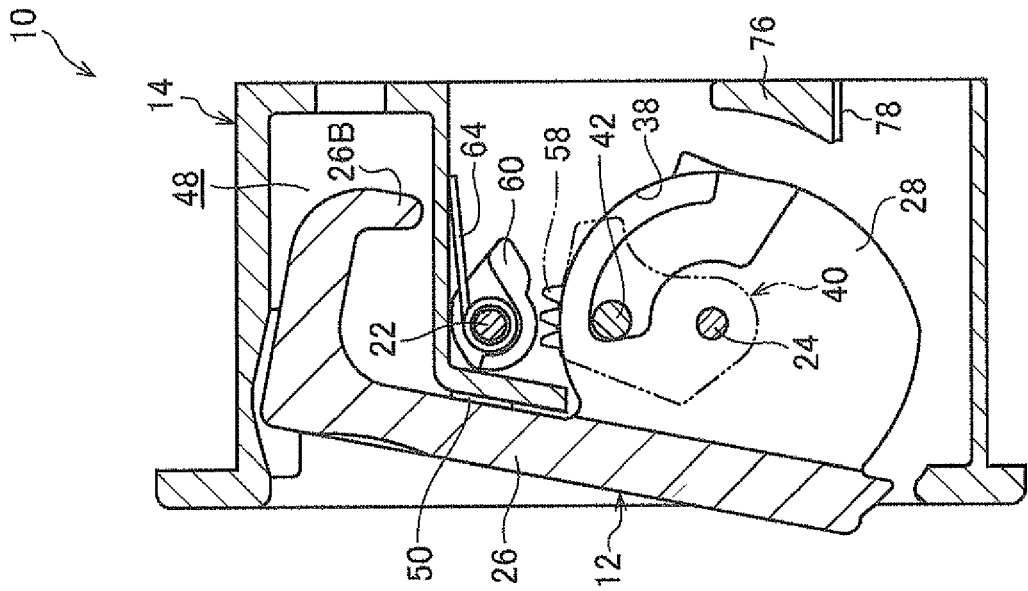
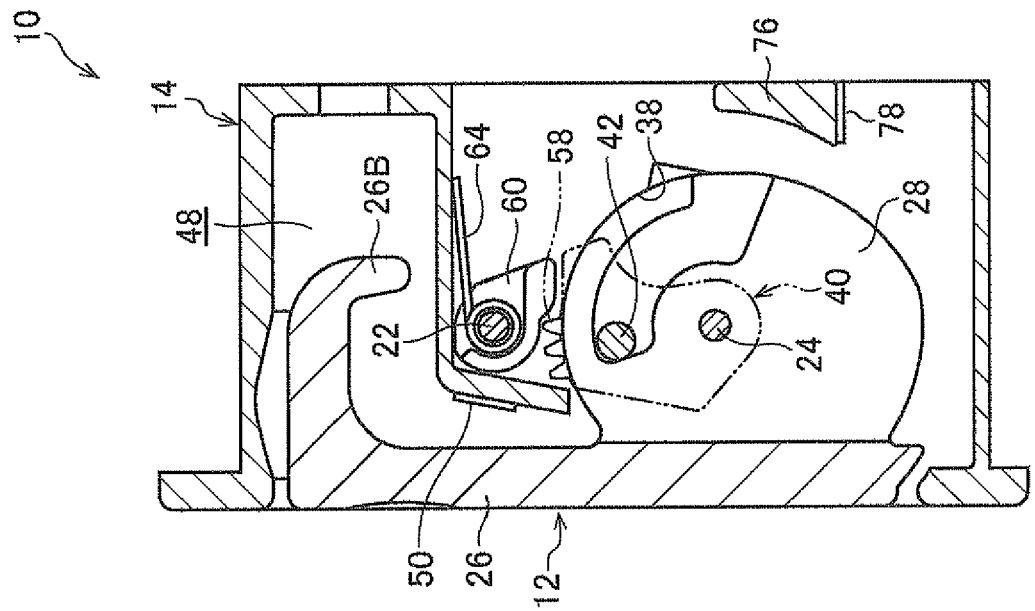

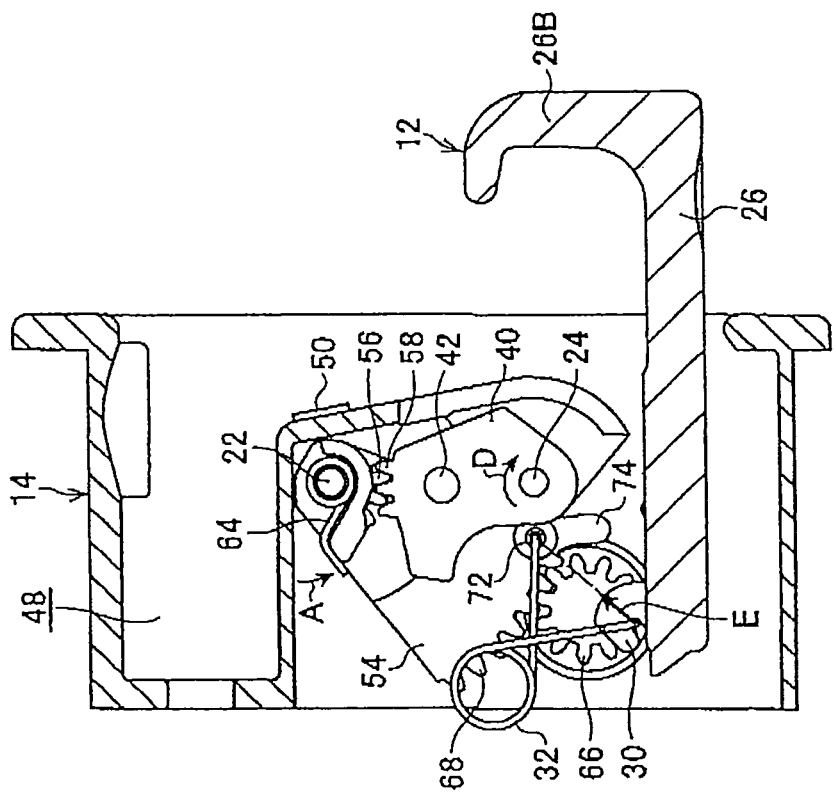
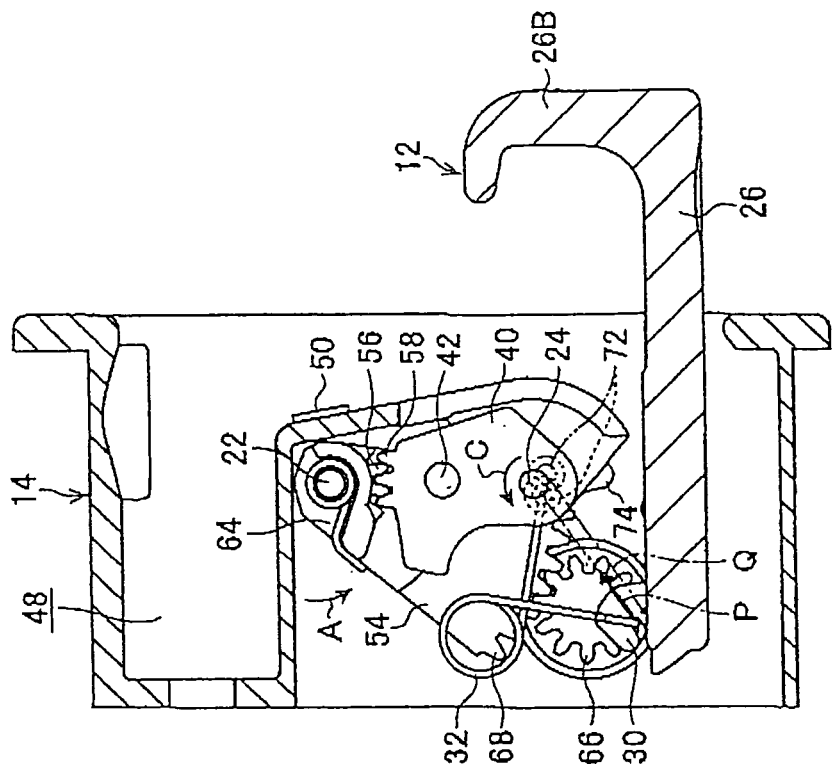
FIG. 6A
FIG. 6B

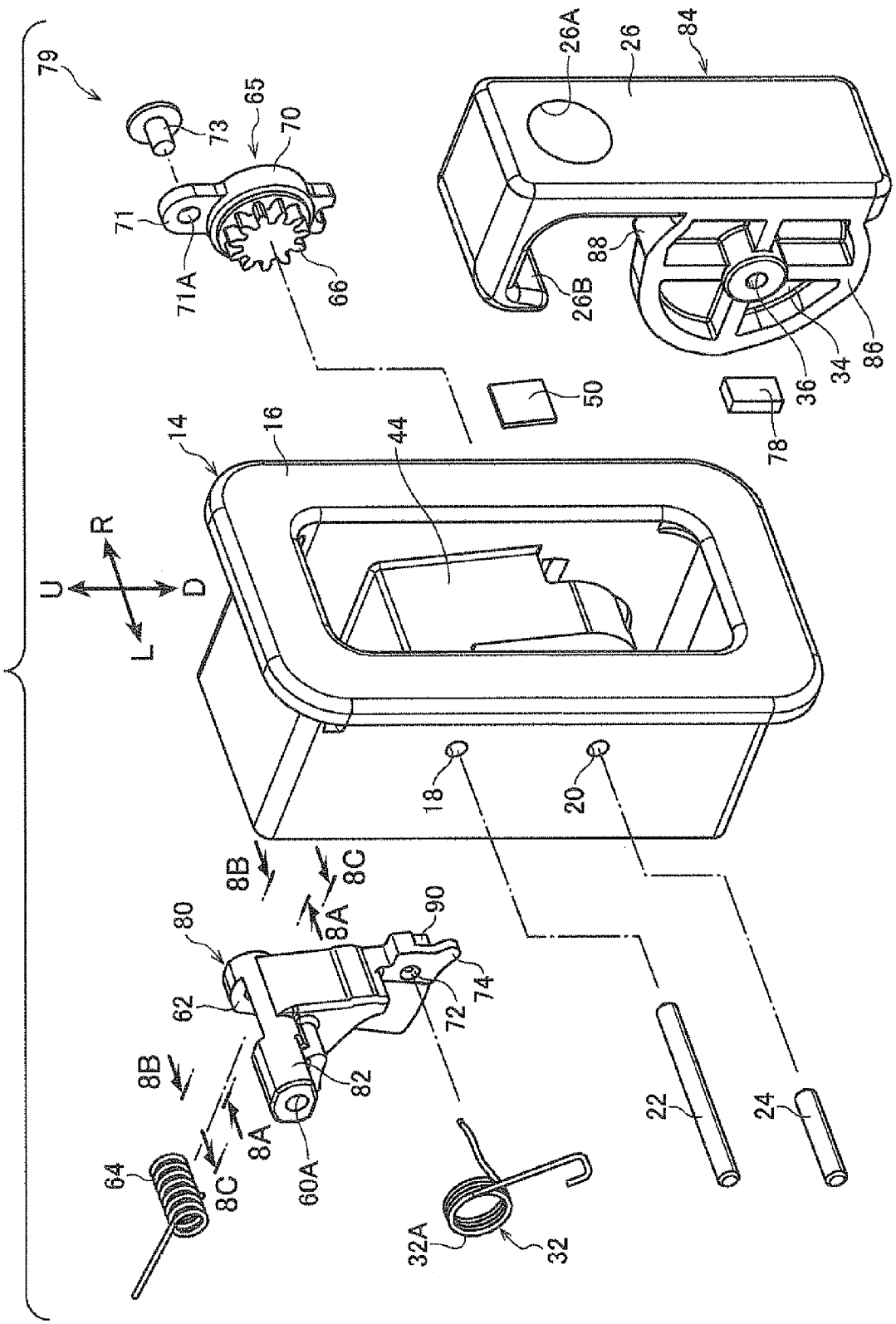

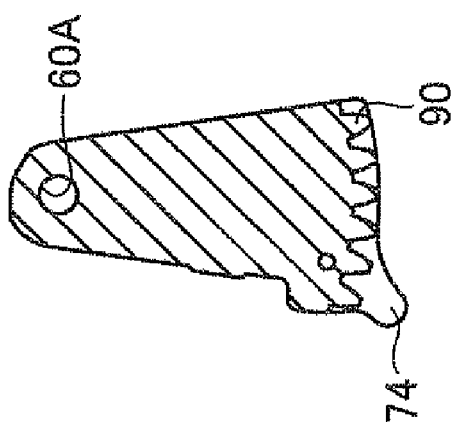
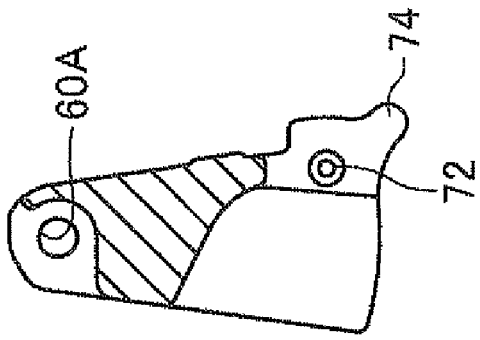

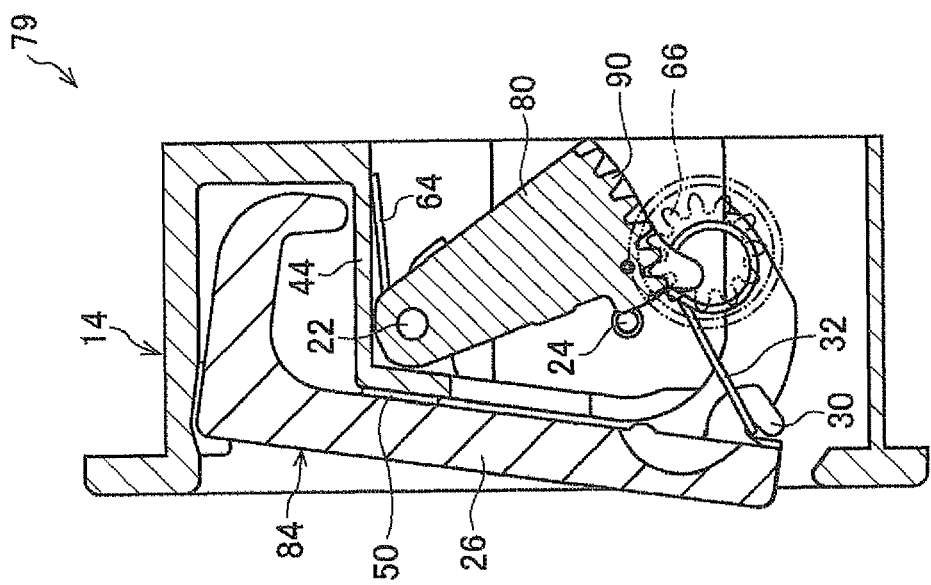
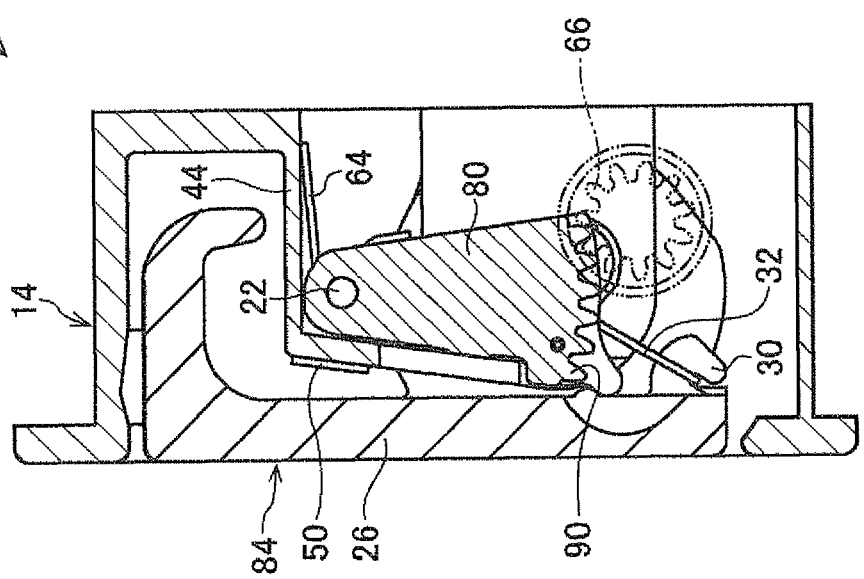

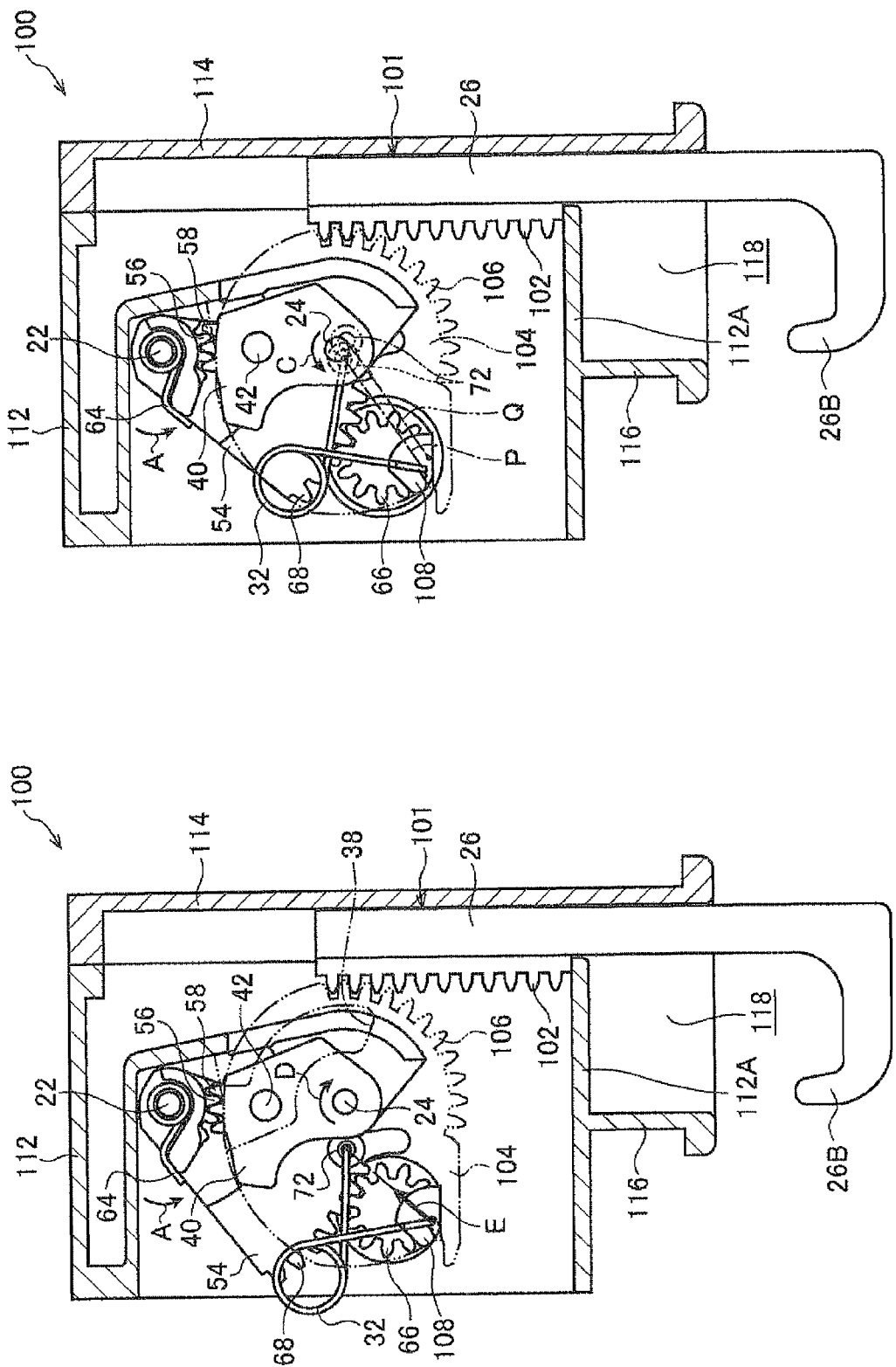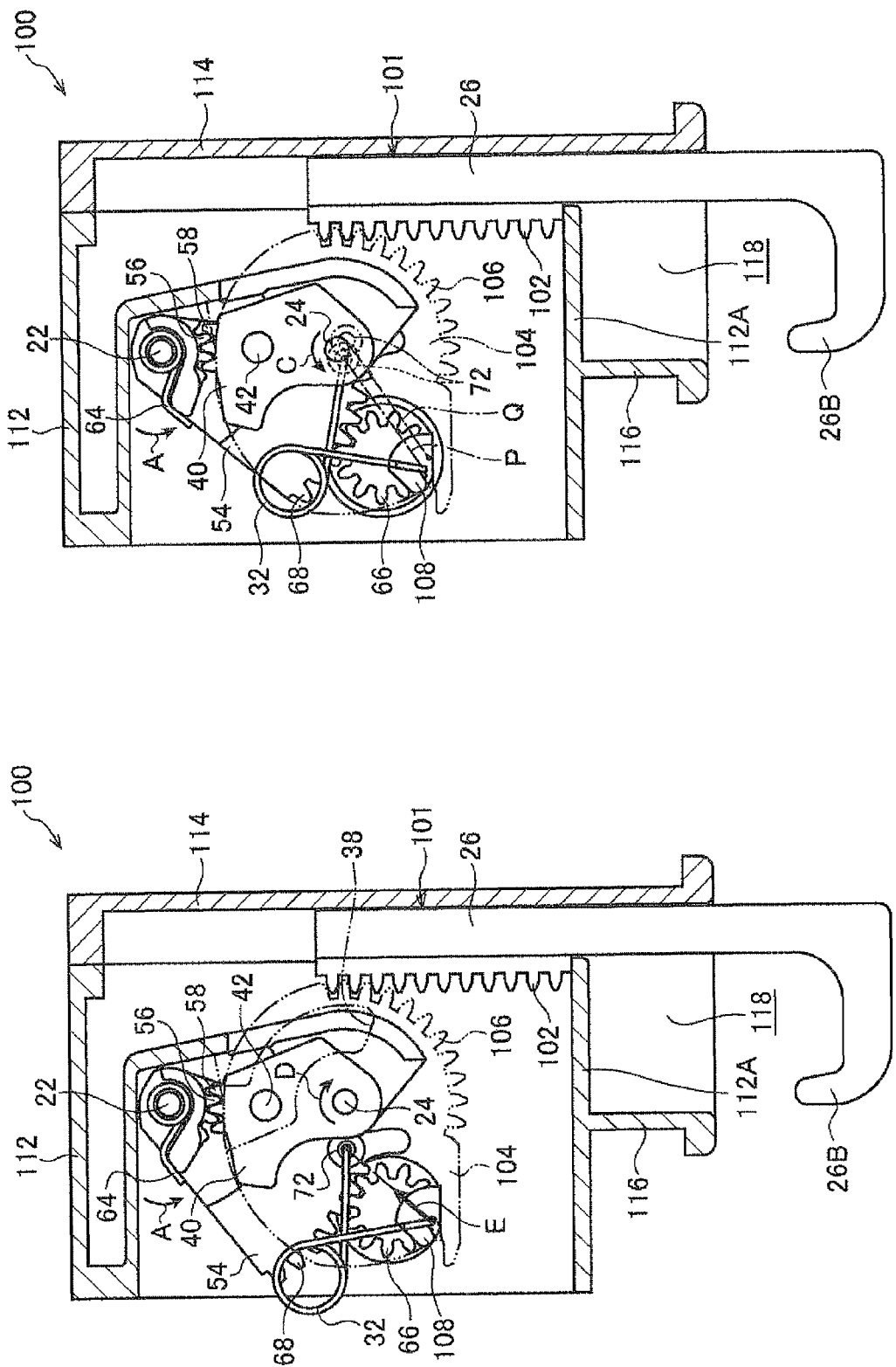

OPERATIONAL MECHANISM FOR MOVABLE BODY

CROSS-REFERENCE TO RELATED APPLICATION

This application claims priority under 35 USC 119 from Japanese Patent Application No. 2008-253324, the disclosure of which is incorporated by reference herein.

BACKGROUND

1. Technical Field

The present invention relates to an operational mechanism for a movable body which may be opened and closed, such as a hook or the like.

2. Related Art

In a vehicle inner space, a claw shaped (substantially "L" shaped) hook is provided projecting towards a vehicle inner side and is used to support clothing, bags, and the like. However, the hook may be an obstacle when it is not being used, since it projects towards a vehicle inner side.

To address the above, in Japanese Patent Application Laid-Open (JP-A) No. 2006-35994, a hook and a case storing the hook are linked by a biasing means, and the hook is biased in a storage direction towards the case. When the hook is used, a finger or the like is used to apply resistance to a biasing force of the biasing means and pull the hook out of the case such that it projects towards a vehicle inner side, and when the finger or the like is released, the hook is stored in the case by the biasing force of the biasing means.

In Japanese Patent Application Laid-Open (JP-A) No. 2006-193883, an opening provided to a main body may be opened and closed by a cover. Outer gears are provided to the cover, and move integrally with the cover. A fixed member is fixed to the main body, and a rotating gear is rotatably attached to the fixed member. The rotating gear engages with a damper gear, and since the damper gear engages with the outer gear, when the cover moves, the rotating gear rotates via the outer gear and damper gear.

Further, a cam groove is formed in the fixed member and a pin is slidably inserted in the cam groove. Depending on the position of the pin, a biasing force of a spring member provided between the main body and the rotating gear changes. As a result, when the door is fully open, a biasing force of the spring member acts upon the door to move it towards a closing direction.

SUMMARY

A first aspect of the operational mechanism for a movable body of the present invention includes: a movable body, rotatably attached to a support, and rotatable to an engaged position, a closed position and an open position; a rotating member, rotatably attached to the support, which rotates due to the movement of the movable body to the engaged position; a biasing member, one end of which is attached to the movable body, and the other end of which is attached to the rotating member; and an operation member, which rotates the rotating member, changes the biasing position of the biasing member with respect to the center of rotation of the movable body, and generates in the biasing member a rotational force that moves the movable body to the closed position or the open position.

BRIEF DESCRIPTION OF THE DRAWINGS

FIG. 3 is an exploded perspective view showing the hook device of the first embodiment;

FIG. 4A is a sectional view taken along line 4A-4A of FIG. 1, and FIG. 4B is a sectional view corresponding to FIG. 4A, showing the hook member moved to an engaged position;

FIGS. 6A and 6B are sectional views taken along line 6A-6A of FIG. 2, and show a change in biasing position of a reversing spring;

FIG. 7 is an exploded perspective view showing a hook device according to a second embodiment;

FIG. 8A is a sectional view taken along line 8A-8A of FIG. 7, FIG. 8B is a sectional view taken along line 8B-8B of FIG. 7, and FIG. 8C is a sectional view taken along line 8C-8C of FIG. 7;

FIGS. 12A and 12B are sectional views of the hook device corresponding to the section taken along line 8B-8B of FIG. 7, and are showing the hook member moved to an engaged position similar to FIG. 4A and FIG. 4B, respectively.

FIGS. 15A and 15B are sectional views showing the hook member in an open position, and show a change in biasing position of a reversing spring.

DETAILED DESCRIPTION OF THE INVENTION

The mechanism of operation of the hook member as a moving body (hook device) according to the present embodiment will now be explained.

First Embodiment

Figure 1:
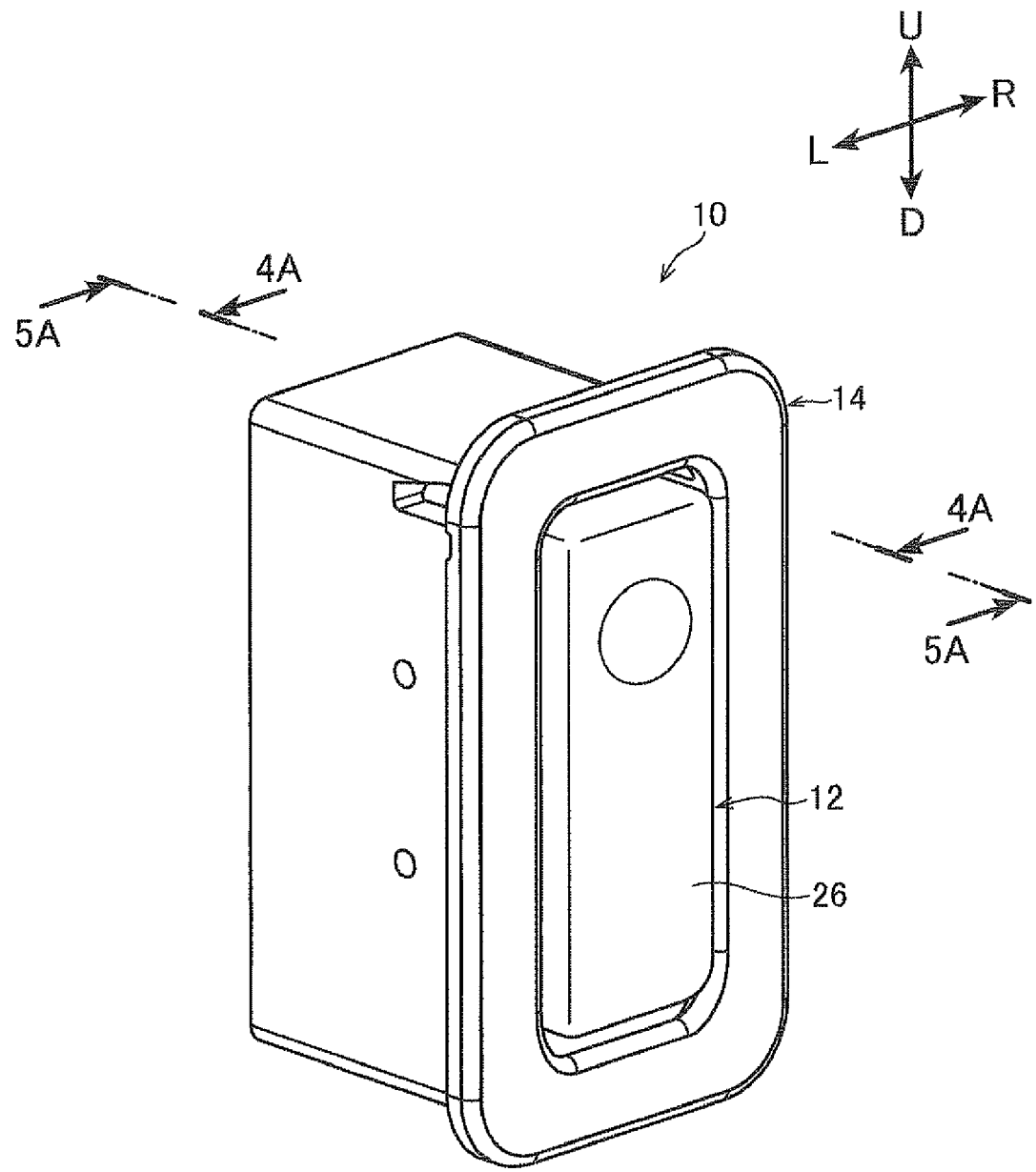
FIG. 1 is a perspective view showing a closed position of the hook member of the hook device of the first embodiment.
Figure 2:
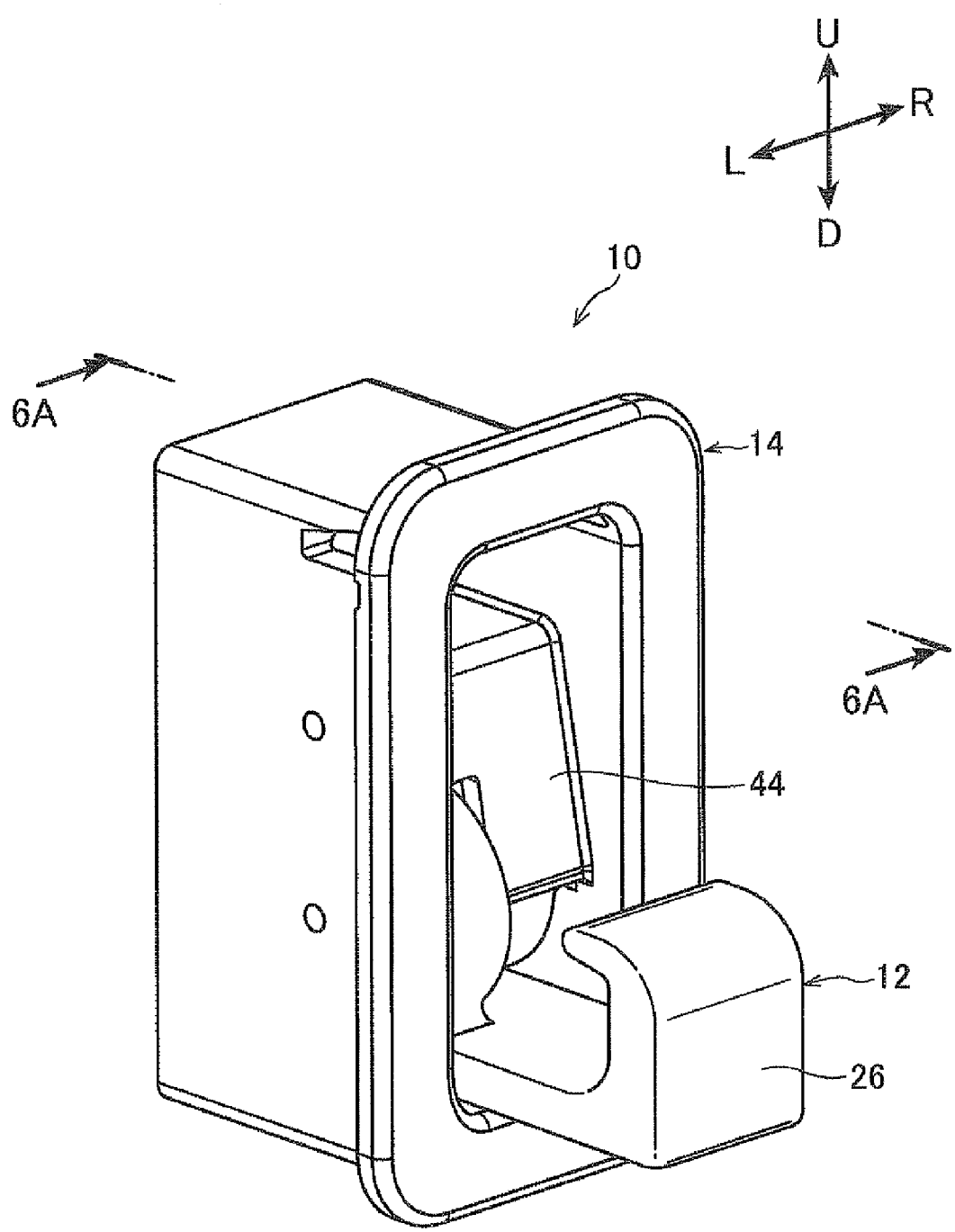
FIG. 2 is a perspective view showing an open position of the hook member of the hook device of the first embodiment.

In the first embodiment, a hook device 10 shown in FIGS. 1-3 is provided at a vehicle body panel or the like, and a hook member (movable body) 12 thereof faces an interior space and may be opened and closed. For ease of explanation, the orientation of hook device 10 in FIGS. 1-3 is made a reference orientation, and up, down, left and right directions (indicated as U, D, L and R, respectively) are as shown in these figures.

Hook device 10 is provided with a box shaped case (support body) 14, which may house hook member 12 therein. A flange portion 16 extends from an end surface of a side wall of the case 14 towards an outer side, around the entire periphery of the case 14. Upper and lower axial support holes 18 and 20 are provided at the side wall in a length direction of the case 14, and shafts 22 and 24 are respectively fixed in the axial support holes 18 and 20.

Hook member 12 includes a hook portion 26, a leading end side of which bends in a hook shape, and a substantially cylinder-shaped drum portion 28 provided at an inner surface of a rear end side of hook portion 26, which is a center of rotation for opening and closing of hook member 12.

A dome-shaped recess portion 26A is formed at an outer surface of the leading end side of the hook portion 26, and functions as a marker when pushing the hook member 12, and also facilitates touching with a finger. A reversed portion 26B is provided at a leading end portion of hook portion 26, which reverses the leading end portion of hook portion 26 towards a drum portion 28 side, and which prevents clothing or the like caught by hook portion 26 from readily falling. An attachment portion 30 is provided at a rear end side of hook portion 26, to which may be attached an end portion of reversing spring (biasing member) 32, which is provided with a torsion portion 32A at a center portion thereof.

Plural inset portions 34 are inset into the surface of drum portion 28, such that the surface of drum portion 28 does not deform after the formation of hook member 12. An axial hole 36 is formed at a center portion of drum portion 28, into which shaft 24 may be inserted, such that drum portion 28 may rotate with respect to shaft 24. Thereby, hook member 12 may rotate around shaft 24 via drum portion 28.

An engaging groove 38 (see FIG. 4A) is provided at the right side of drum portion 28, and a pin (pushing portion) 42 provided with a first gear member (small-diameter gear member) 40, to be explained later, may engage therewith.

A cover portion 44 is provided in case 14, which conceals each element housed in case 14, such that each element is not exposed when hook member 12 is in an open state. As a result, hook device 10 is made more attractive, and each element may be protected from dust and the like.

Figure 5A:
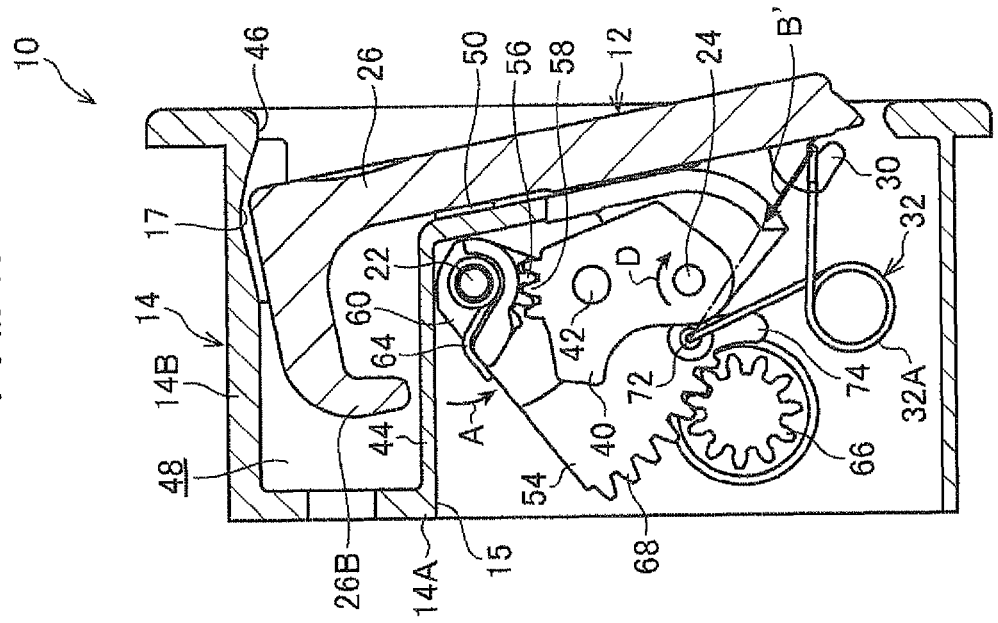
FIG. 5A is a sectional view taken along line 5A-5A in FIG. 1.

As shown in FIG. 5A, at a central upper portion of case 14, cover portion 44 as seen in cross-section extends in a horizontal direction from a base portion 14A (an opening 15 is partially formed in base portion 14A to avoid interference with reversing spring 32) of case 14, and a leading end portion of cover portion 44 bends and inclines downwards towards an opening portion 46 side of case 14.

At an upper portion of case 14, a space 48 is provided between an inner surface of upper wall 14B of case 14 and cover portion 44, and, as shown in FIG. 5A, when hook member 12 is in a closed state (that is, at a closed position (reference position) of hook member 12), the leading end portion of hook portion 26 may be housed in space 48.

Figure 5B:
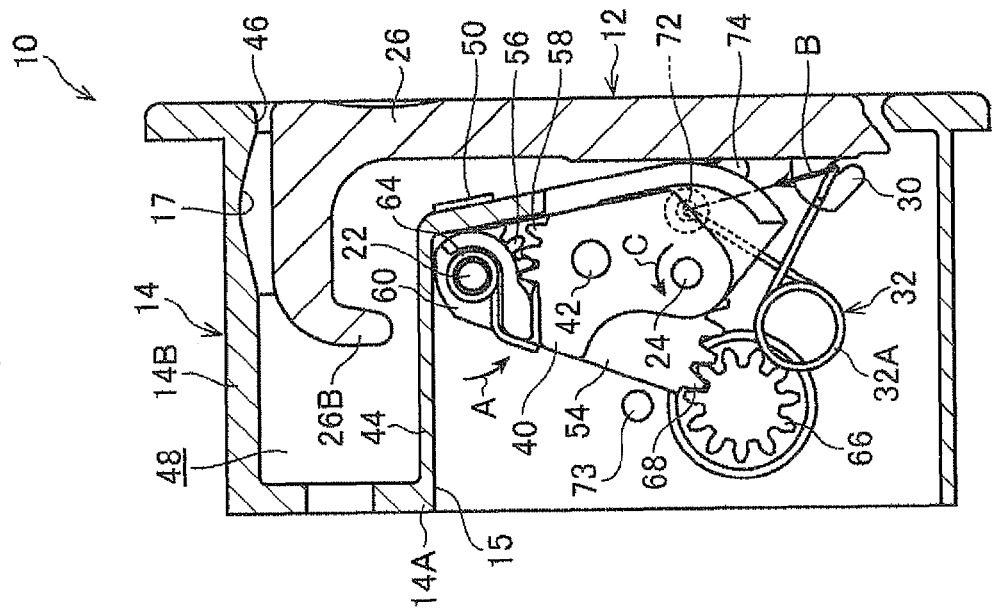
FIG. 5B is a sectional view corresponding to FIG. 4A, showing the hook member moved to an engaged position.

When hook member 12 is in a closed state, hook member 12 may rotate (move) around shaft 24 in a pushing-in direction toward the inside of case 14, as shown in FIG. 5B, and hook member 12 may be rotated until the movement of hook portion 26 is limited by contacting cover portion 44 (until it reaches a pushed-in position/an engaged position/predetermined position, same as hereinafter).

A cushion 50 made of a rubber material or the like is fixed to the surface of cover portion 44 such that hook portion 26 may contact therewith. As a result, hook portion 26 contacts cover portion 44 via cushion 50, which absorbs the impact of hook portion 26 at a time of contact.

When hook portion 26 contacts cover portion 44 via cushion 50, a leading end portion of hook portion 26 describes an arc-shaped movement locus around shaft 24. An inset portion 17 is formed at an inner surface of upper wall 14B of case 14, such that the leading end portion of hook portion 26 does not interfere with an inner wall of case 14, or cover portion 44.

A first gear member 40 is rotatably provided and axially supported at shaft 24. At first gear member 40 is formed an axial hole 52 into which shaft 24 may be inserted, an engaging pin 42 that engages with engaging groove 38 formed in drum portion 28, and a gear portion 58 (first gear) that engages with a gear portion 56 (second gear/small diameter gear) provided to a second gear member 54 (large diameter gear member) which is described below. Gear portion 58 and axial hole 52 are arranged on opposite sides with respect to engaging pin 42.

As shown in FIG. 4A, when hook member 12 is in a closed position, engaging pin 42 of first gear member 40 contacts an end of engaging groove 38 of drum portion 28. As shown in FIG. 4B, when hook member 12 is pushed in a pushing-in direction, engaging pin 42 is pushed by the end of engaging groove 38. As a result, first gear member 40 rotates around shaft 24.

As shown in FIGS. 5A and 5B, second gear member 54 is rotatably supported at shaft 22. As shown in FIG. 3, cylinder-shaped axial portion 60 is provided at gear member 54, and shaft 22 is inserted into axial hole 60A formed in a center portion of axial portion 60.

A housing portion 62 is formed at a central portion in a length direction of axial portion 60, which can house a torsion coil spring 64. Shaft 22 is inserted into coil portion 64A of torsion coil spring 64. An end portion of torsion coil spring 64 contacts second gear member 54, and the other end portion is fixed to a case 14 side, and as shown in FIG. 5A, torsion coil spring 64 biases second gear member 54 in the direction of arrow A (a direction that releases hook member 12).

In the vicinity of axial portion 60 of gear member 54 is formed gear portion 56 that engages with gear portion 58 of first gear member 40. A gear portion 68 (third gear/large-diameter gear) that engages with a damping gear 66 described below is formed at a free end of second gear member 54.

Due to the rotation of hook member 12, when first gear member 40 rotates, gear portion 56 rotates via gear portion 58 of first gear member 40, and second gear member 54 provided with gear portion 56 rotates around shaft 22. As a result, damping gear 66, which engages with gear portion 68 of second gear member 54, also rotates.

Damping gear 66 forms part of a damping unit 65, and is attached to a cylinder-shaped housing 70. Housing 70 is filled with a viscous liquid such as silicon oil or the like, and when damping gear 66 is regularly or reversely rotated, a viscous resistance is generated due to the viscous liquid. As a result, a damping effect due to the viscous resistance acts upon second gear member 54 via gear portion 68, and second gear member 54 rotates quietly.

A fixing piece 71 extends from an outer peripheral surface of housing 70, and a fixing pin 73 is inserted at a fixing hole 71A provided at fixing piece 71, and damping unit 65 is fixed to case 14 via fixing pin 73.

Thus, by fixing damping unit 65 at a single position of the outer peripheral surface of housing 70, damping unit 65 may rotate around fixing pin 73. As a result, a clearance between gear portion 68 and damping gear 66 may be set by adjusting a constrictive force of fixing pin 73.

At a case 14 opening portion 46 side of gear portion 68, attachment portion 72 is provided, to which the other end of reversing spring 32 is attached. The one end of reversing spring 32, as described above, is attached to attachment portion 30 provided at the rear end side of hook member 12, and, as shown in FIG. 5A, when hook member 12 is in a closed position, both end portions of reversing spring 32 are biased towards a direction so as to mutually approach.

An extending piece 74 is provided extending from attachment portion 72 of second gear member 54 towards a case 14 opening portion 46 side, which may contact with an inner surface of hook member 12 when hook member 12 is in a closed state.

Operation of the Hook Member

As shown in FIG. 5A, when hook member 12 is at a closed position (reference position), attachment portion 30 of hook member 12 is positioned at a case 14 inner edge lower portion side of opening portion 46, and attachment portion. 72 of second gear member 54 is at a position above with respect to attachment portion 30 and inclined towards the inside of case 14. The ends of reversing spring 32 are attached to attachment portion 30 and attachment portion 72, respectively, and both end portions of reversing spring 32 are biased towards a direction of mutually approaching (and elastic energy is stored).

Here, gear portion 68 of second gear member 54 engages with damping gear 66, and due to viscous resistance by damping gear 66, the movement of second gear member 54 is regulated up to a predetermined stress value. In contrast with this, when hook member 12 is in a closed position, there is no regulation of movement of hook member 12 by a movement regulating member such as a stopper or the like.

Reversing spring 32 is attached to hook member 12 and second gear member 54, and one end thereof (attachment portion 30 of hook member 12) moves more readily than another end thereof (attachment portion 72 of second gear member 54). As a result, a biasing force of reversing spring 32 acts in the direction of arrow B.

Since the center of rotation of hook member 12 is shaft 24, due to the biasing force of reversing spring 32, a moment centered on shaft 24 acts upon hook member 12 in the direction of arrow C (a closing direction of hook member 12). Meanwhile, the one end portion of torsion coil spring 64 contacts second gear member 54 and biases second gear member 54 in the direction of arrow A (an opening direction of hook member 12).

As a result, when hook member 12 is at a closed position, a stress in a closing direction of hook member 12 and a stress in an opening direction of hook member 12 are set to counterbalance, and hook member 12 is maintained in a closed state.

When hook member 12 is pushed from a closed position, as shown in FIG. 4A, towards a pushed-in position (an engaged position/predetermined position) as shown in FIG. 4B, engaging pin 42 of first gear member 40 is pushed by the end of engaging groove 38 of drum portion 28, and first gear member 40 rotates around shaft 22.

As shown in FIGS. 5A and 5B, as a result of the rotation of first gear member 40, gear portion 56 rotates via gear portion 58 of first gear member 40, and second gear member 54 having gear portion 56 rotates around shaft 22. As a result, torsion coil spring 64 is biased in a resistance direction with respect to the biasing force thereof (an opening direction of hook member 12), and elastic energy is stored therein.

As a result of the rotation of second gear member 54, attachment portion 72 moves inwards with respect to shaft 24. As a result, in addition to further elastic energy being stored in reversing spring 32, the biasing force thereof acts in the direction of arrow B'. As a result, a moment centered around shaft 24 acts upon hook member 12 in the direction of arrow D (an opening direction of hook member 12).

Since gear portion 68 of second gear member 54 engages with damping gear 66, and the movement of second gear member 54 is regulated up to the predetermined stress value, a biasing force of reversing spring 32 acts upon hook member 12 before a biasing force of torsion coil spring 64 does.

In other words, due to a biasing force of reversing spring 32, the one end of reversing spring 32 (attachment portion 30 of hook member 12) is pulled towards a side of the other end of reversing spring 32 (attachment portion 72 of second gear member 54), and accordingly, as shown in FIG. 6A, hook member 12 rotates in an opening direction.

A stopper 76 is provided in case 14 (see FIG. 4A), and a cushion 78 made of a rubber material is fixed at a lower surface of stopper 76. When hook member 12 opens, the hook member 12 contacts cushion 78, and an impact of hook member 12 is absorbed by cushion 78 at a time of contact therewith.

When hook member 12 opens (hook member 12 is at an open position or a protruding position thereof), hook member 12 is provided at substantially horizontal position, and clothing or the like may be caught on hook portion 26. At this time, the one end of reversing spring 32 (attachment portion 30 of hook 12) is disposed below and at an angle towards the inside of case 14 with respect to the other end of reversing spring 32 (attachment portion 72 of second gear member 54).

When hook member 12 is at an open position, similar to when it is at a closed position, both ends of reversing spring 32 are biased in a direction so as to mutually approach. As a result, the biasing force of reversing spring 32 acts in the direction of arrow E. Therefore, a moment acts upon hook member 12 in the direction of arrow D (an opening direction of hook member 12), centered around shaft 24.

As stated above, in this state, elastic energy acting a direction that opens hook member 12 is stored in torsion coil spring 64. As a result, due to a biasing force of torsion coil spring 64, second gear member 54 rotates gradually around shaft 22.

Due to the rotation of second gear member 54, the direction in which the biasing force obtained from reversing spring 32 acts gradually shifts. Here, when second gear member 54 rotates around shaft 22, damping gear 66 rotates via gear portion 68. As a result, a damping force of damping gear 66 acts upon second gear member 54.

As shown in FIG. 6B, when a line of action (virtual line) P, that connects the one end of reversing spring 32 (attachment portion 30 of hook member 12) and the other end of reversing spring 32 (attachment portion 72 of second gear member 54), reaches a position at which it is superposed with shaft 24 of hook member 12, a moment centered around shaft 24 does not act upon hook member 12. As a result, hook member 12 is maintained in an opened state.

If, in this state, second gear member 54 rotates further in the direction of arrow A, line of action P of the biasing force of reversing spring 32 moves towards line of action Q, and a moment centered around shaft 24 acts upon hook member 12 in the direction of arrow C (a closing direction of hook member 12).

In other words, an action direction of a biasing force of reversing spring 32 (a biasing member) changes (bias direction switching mechanism) taking as a boundary at a position at which the line of action (virtual line) P of the biasing force of reversing spring 32 is superposed with shaft 24 of hook member 12, and a force towards a closing direction acts upon hook member 12 due to reversing spring 32, and hook member 12 is biased in a closing direction.

As a result, hook member 12 rotates in a closing direction, and second gear member 54 also rotates around shaft 22. Consequently, damping gear 66 rotates via gear portion 68, and a damping action of damping gear 66 acts upon second gear member 54. The damping action of damping gear 66 also acts upon hook member 12 via reversing spring 32, and hook member 12 rotates quietly.

Figure 16A:
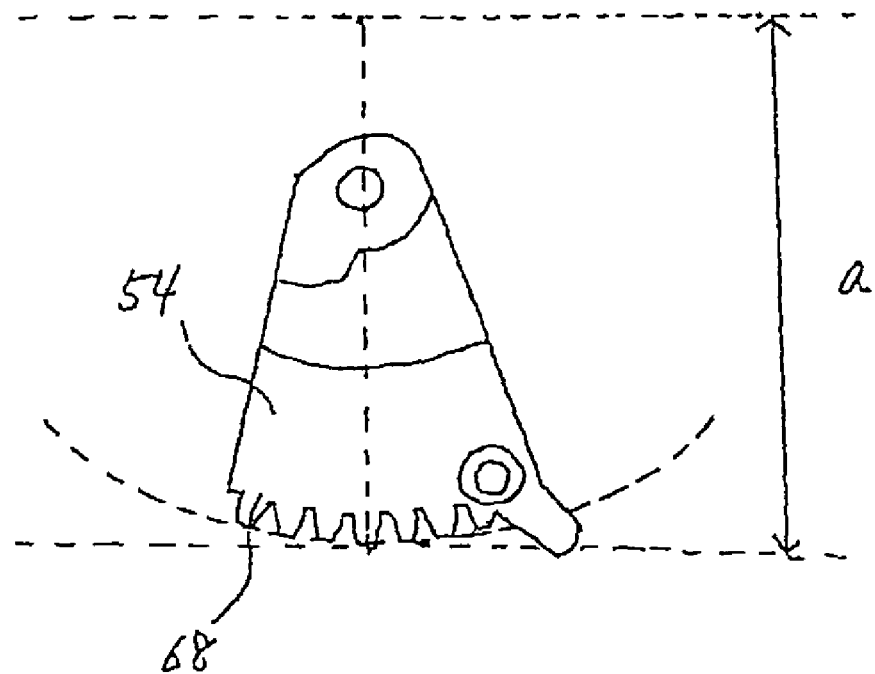
FIGS. 16A and 16B show details of FIGS. 5A and 5B.
Figure 16B:
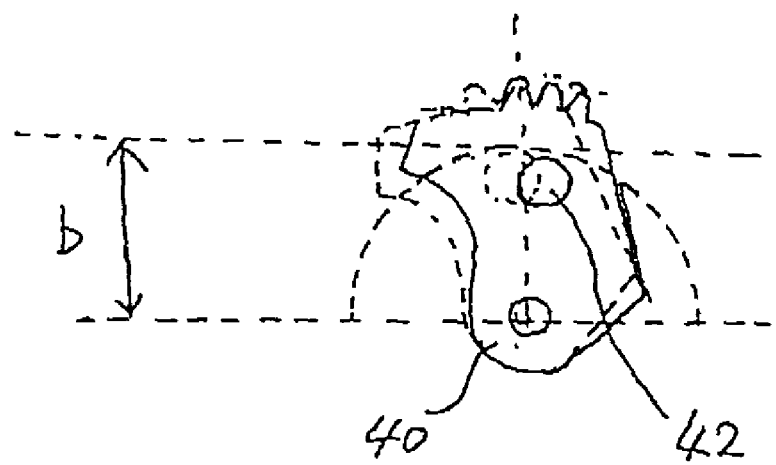

Note that gear portion 68, which engages with damping gear 66, is provided at a free end side of second gear member 54, and gear portion 56, which engages with gear portion 58 of first gear member 40 is provided at a center of rotation side of second gear member 54, and the curvature radius of gear portion 68 is larger than the curvature radius of gear portion 56. In other words, the movement amount of gear portion 68 is larger than the movement amount of gear portion 56, such that a damping action that acts upon hook member 12 due to damping gear 66 acts for a long period of time. FIGS. 16A and 16B show more details of FIGS. 5A and 5B by extracting a second gear member 54 (a rotating member) and a first gear member 40 having an engaging pin 42 (a pushed portion) from FIGS. 5A and 5B. The second gear member 54 has a gear portion 68 (a gear portion) that engages with a damping gear 66. As shown in the drawings, a distance "a" indicates the curvature radius of the gear portion and a distance "b" indicates the curvature radius of the movement locus of the pushed portion. The engaging pin 42 corresponding to the pushed portion.

As shown in FIG. 5A, when hook member 12 is in a closed position, extending piece 74 of second gear member 54 contacts an inner surface of hook member 12, and the movement of hook member 12 is regulated.

Operation of Hook Member

As shown in FIG. 5A, in the present embodiment, one end of reversing spring 32 is attached to hook member 12, and the other end of reversing spring 32 is attached to second gear member 54. As shown in FIG. 5B, due to pushing of hook member 12 from a closed position, second gear member 54 rotates, and the position at which the biasing force of reversing spring 32 acts (a biasing position) changes with respect to the center of rotation (shaft 24) of hook member 12. As a result, rotational force that rotates hook member 12 towards an open position (see FIG. 5A) or a closed position (see FIG. 6A) is generated at reversing spring 32.

Specifically, one end of torsion coil spring 64 is attached to case 14, and the other end is attached to second gear member 54, and when hook member 12 is rotated towards a pushed-in position when torsion coil spring 64 is biasing second gear member 54 towards an opening direction of hook member 12, gear 54 is rotated, and elastic energy is stored in torsion coil spring 64.

At this time, elastic energy is also stored in reversing spring 32, and a biasing force of reversing spring 32 is used when hook member 12 is opened. When hook member 12 is in an open state, a biasing force of torsion coil spring 64 is used.

In other words, as shown in FIG. 6B, when the center of rotation of hook member 12 (shaft 24) is positioned on line of action P at which a biasing force of reversing spring 32 acts, a moment due to the biasing force of reversing spring 32 does not act upon hook member 12.

However, when the center of rotation of hook member 12 is not on line of action P of the biasing force of reversing spring 32, if, for example, the center of rotation of hook member 12 is on line of action Q of the biasing force of reversing spring 32, a moment acts upon hook member 12 in the direction of arrow C due to a biasing force of reversing spring 32.

In this way, second gear member 54 is rotated by the biasing force of torsion coil spring 64, and by changing the biasing position of reversing spring 32 with respect to the center of rotation of hook member 12, the direction of the moment that acts upon hook member 12 can be changed, and a rotational force that rotates hook member 12 in an opening direction or a closing direction can be generated at reversing spring 32.

By changing the direction of a biasing force that acts upon hook member 12 by reversing spring 32, after opening hook member 12, hook member 12 may be automatically returned to a closed position following a predetermined period of time (when the biasing force that acts upon hook member 12 has changed). The predetermined period of time may be adjusted by adjusting the biasing force of torsion coil spring 64 or the damping force of damping gear 66.

For ease of explanation, the above description has assumed that the orientation of hook device 10 as shown in FIGS. 1-3 is upward and downward directions. However, depending on the position of attachment and the like thereof, hook device 10 may be arranged with flange portion 16 of case 14 as an upper surface thereof, or with flange portion 16 as a lower surface thereof. In each case, the shape of hook portion 26 of hook member 12 may be changed accordingly.

In the present embodiment, the biasing position of reversing spring 32 with respect to the center of rotation (shaft 24) of hook member 12 changes, and a rotational force that rotates hook member 12 to a closed position (see FIG. 5A) or an open position (see FIG. 6A) is generated in reversing spring 32. However, the present invention is not limited to the above configuration.

Second Embodiment

A second embodiment is shown in FIG. 7. In the first embodiment, gear members 40 and 54 are used to interlock with the operation of hook member 12. In the present embodiment, in a hook device 79, a rotating member 80 is used to interlock with the operation of hook member 12. Further, parts identical to those of the first embodiment are labeled with the same reference numerals, and detailed descriptions thereof are omitted.

FIGS. 8A-8C are sectional views of rotating member 80 corresponding to the lines of section shown in FIG. 7. As shown in FIG. 7, rotating member 80 is provided with an axial portion 82, which contacts with a projecting portion 88 provided at an upper portion of drum 86 of hook member 84.

Figure 9B:
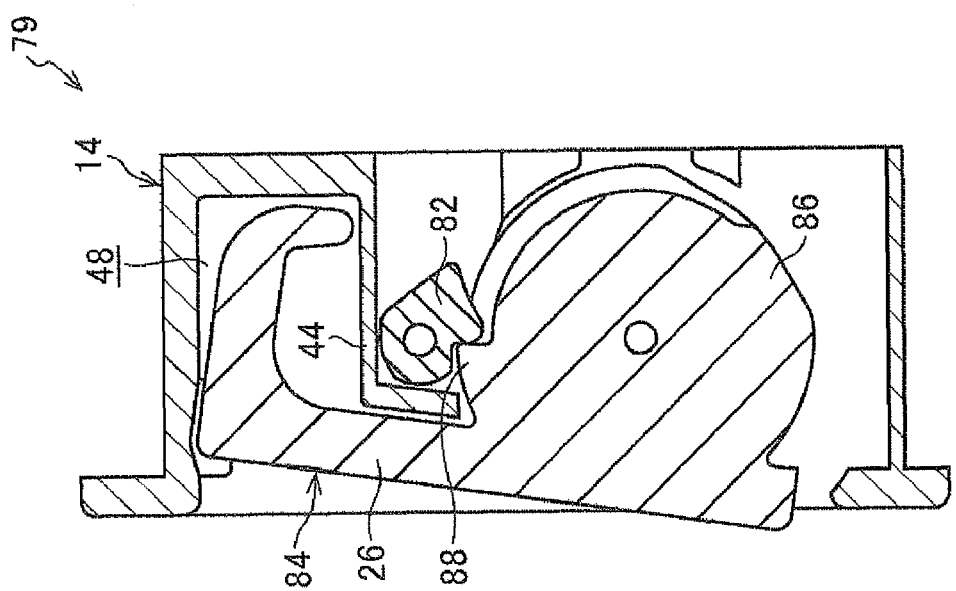
FIGS. 9A and 9B are sectional views of the hook device corresponding to the section taken along line 8C-8C of FIG. 7, and showing pushed-in operations similar to FIG. 4A and FIG. 4B, respectively.
Figure 9A:
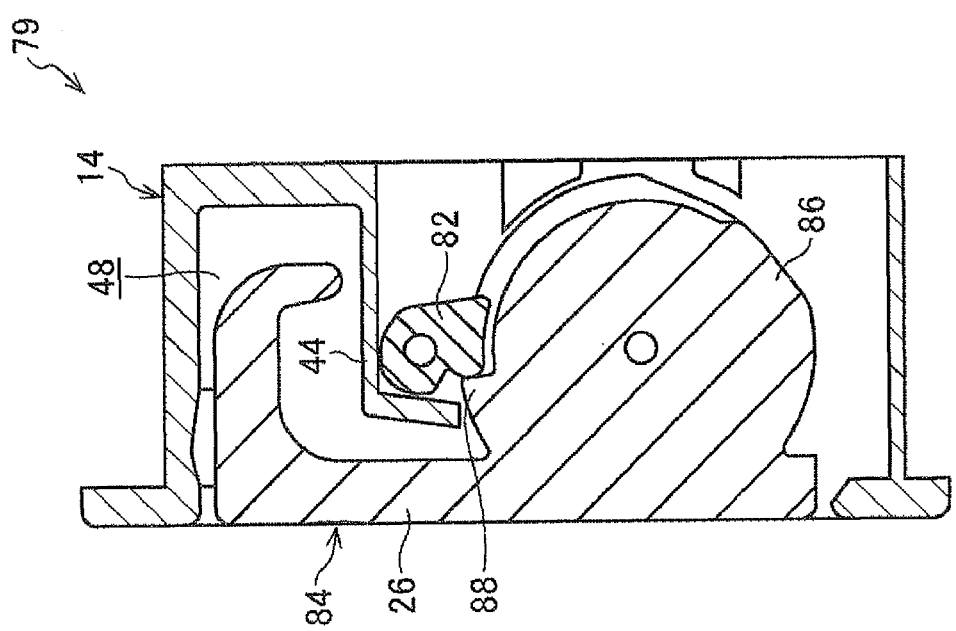
Figure 10A:
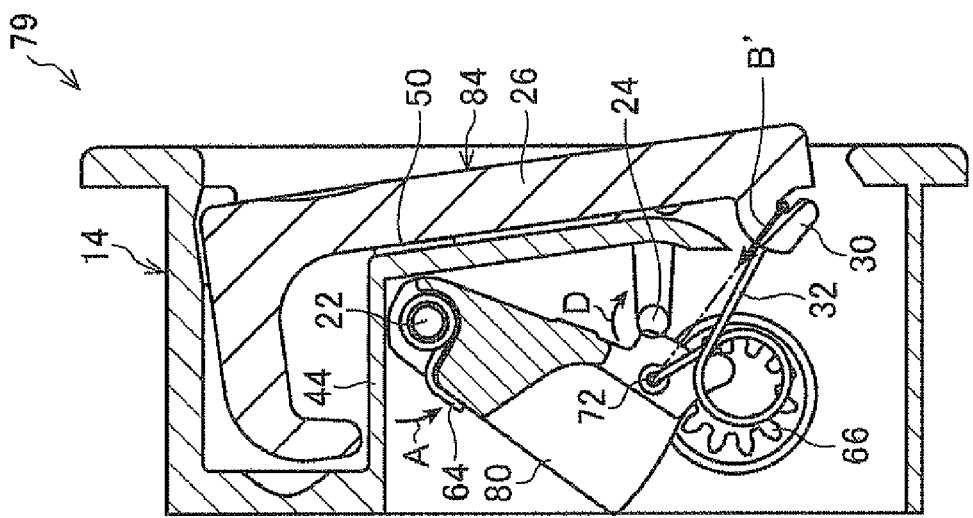
FIGS. 10A and 10B are sectional views of the hook device corresponding to the section taken along line 8A-8A of FIG. 7, and are showing pushed-in operations similar to FIG. 5A and FIG. 5B, respectively.
Figure 10B:
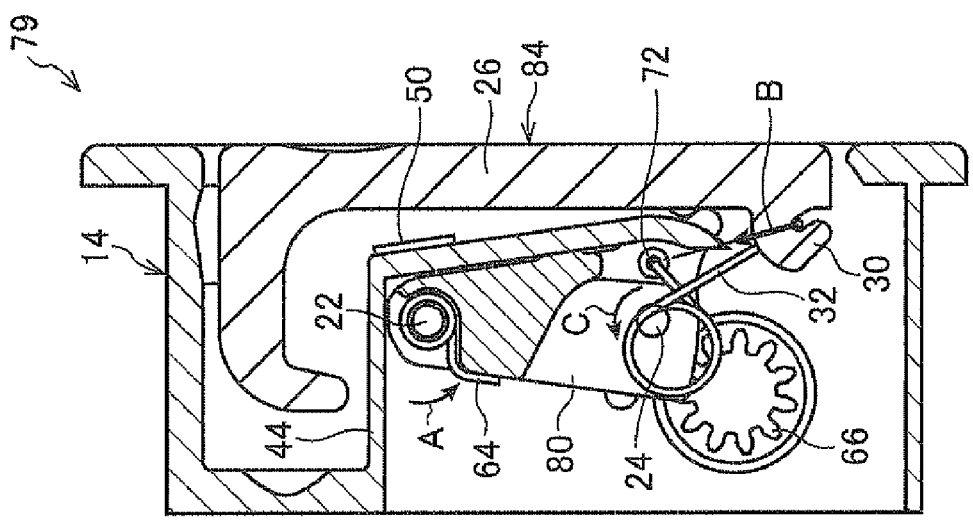
Figure 11A:
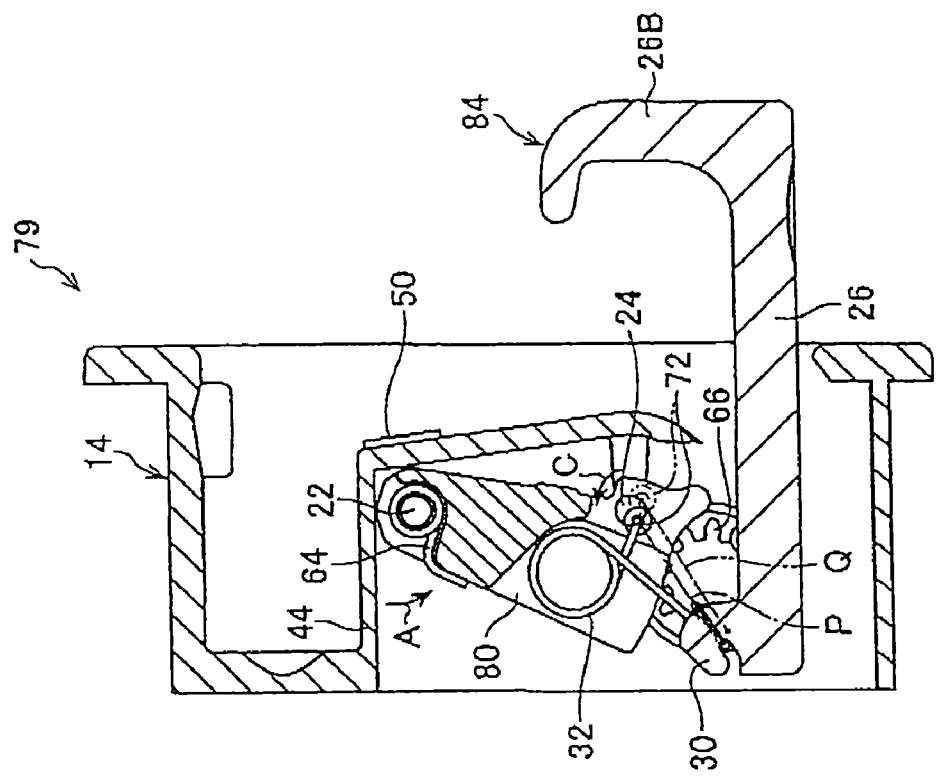
FIGS. 11A and 11B are sectional views of the hook device corresponding to the section taken along line 8A-8A of FIG. 7, and are showing a change in biasing position of a reversing spring similar to FIG. 6A and FIG. 6B, respectively.
Figure 11B:
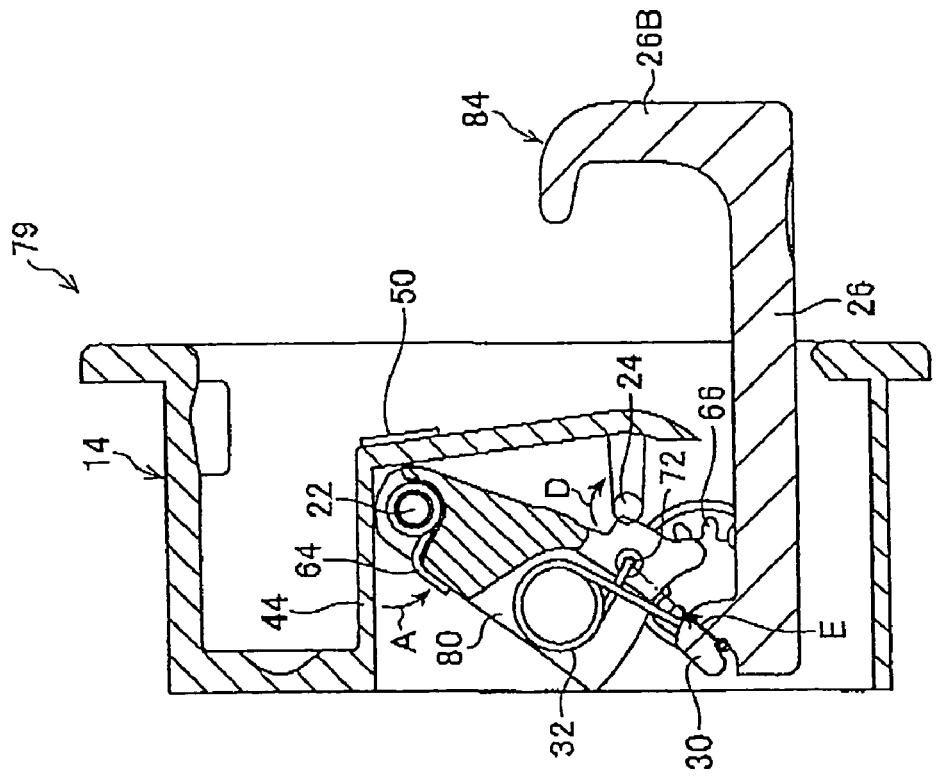

If, when hook member 84 is in a closed position as shown in FIG. 9A, hook member 84 is pushed in a pushing-in direction, axial portion 82 is pushed via projecting portion 88, as shown in FIG. 9B. As a result, as shown in FIGS. 10A and 10B, rotating member 80 rotates around shaft 22. As shown in FIG. 12B, gear 90 is provided at a free end side of rotating member 80, and engages with damping gear 66.

In the present embodiment the movement of hook member 84 is as shown in FIGS. 10A through 10B, and since it is substantially the same as the movement of hook member 12 in the first embodiment, a detailed explanation thereof is omitted here. However, compared to the first embodiment, since it is possible to reduce the number of component parts, it is possible to reduce costs accordingly.

In the first embodiment and the second embodiment, hook member 12 rotates around shaft 24; however, the movement of hook member 12 is not limited thereto.

Third Embodiment

Figure 13:
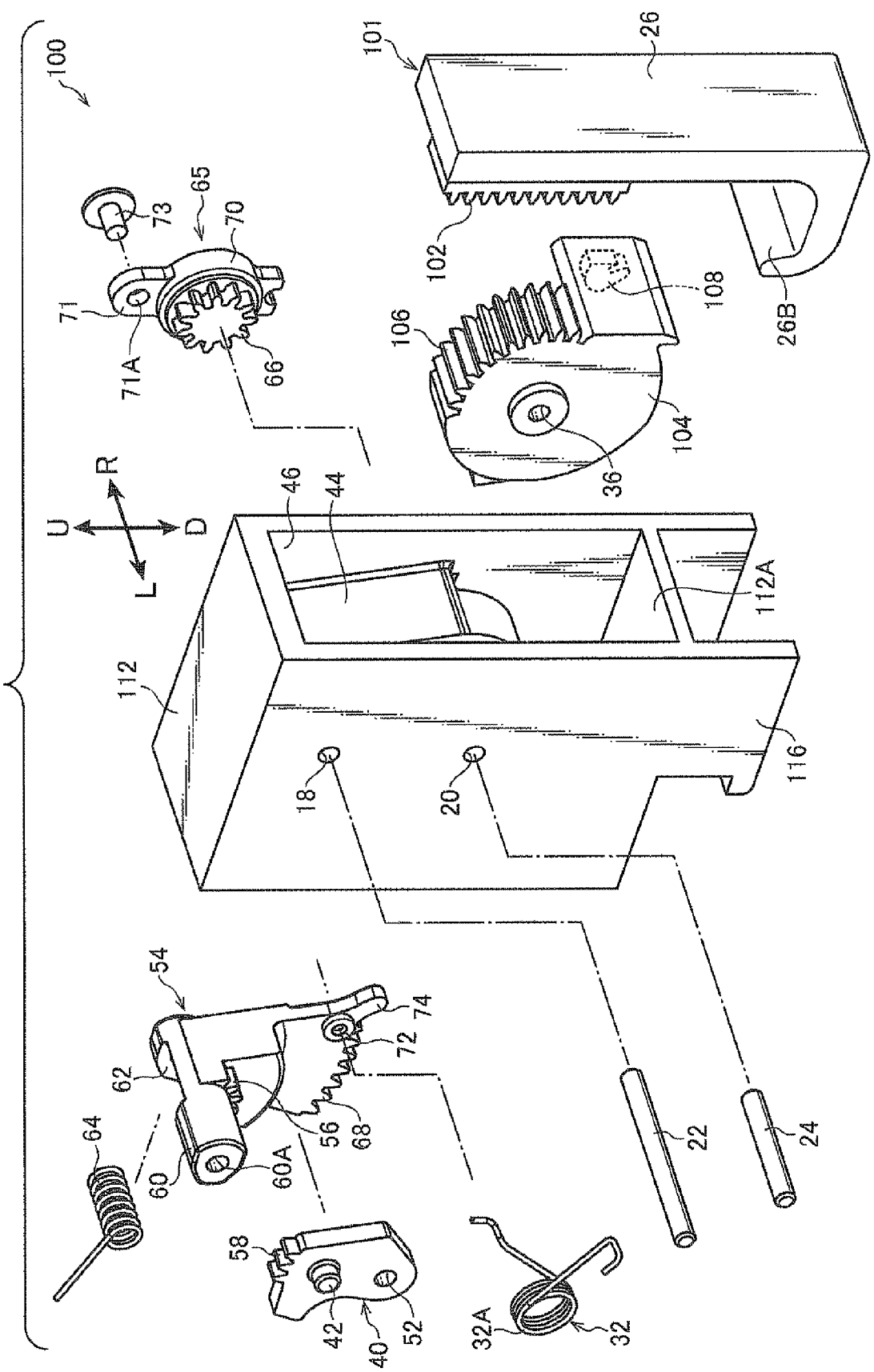
FIG. 13 is an exploded perspective view showing a hook device according to a third embodiment.

A third embodiment is shown in FIG. 13. Parts identical to those of the first embodiment are labeled with the same reference numerals, and detailed descriptions thereof are omitted.

As shown in FIGS. 14 and 15, in the present embodiment, a hook member 101 moves upward and downward (vertically) in a hook device 100. Hook member 101 includes hook portion 26 and a rack portion 102. Rack potion 102 is provided at an inner surface of hook member 101, and positioned at a side opposite to hook portion 26. Pinion portions 106 formed at an outer peripheral surface of a cylindrical rotating body 104 are configured to engage with rack portion 102.

Rotating body 104 is axially supported by shaft 24 and may rotate around shaft 24. As a result of the rotation of rotating body 104, rack portion 102 moves vertically via pinion portions 106, and hook member 101 moves vertically via rack portion 102. An attachment portion 108 is provided at rotating body 104, and one end of reversing spring 32 is attached to attachment portion 108.

Hook device 100 is provided with a box-shaped case 112, and a cover portion 114 is provided at opening portion 46 of case 112 such that hook member 101 is not exposed when hook member 101 is in a closed state. Although not shown in the drawings, cover portion 114 is provided with a guide portion running in a vertical direction, and hook member 101 is guided in a vertical direction by the guide portion.

Figure 14A:
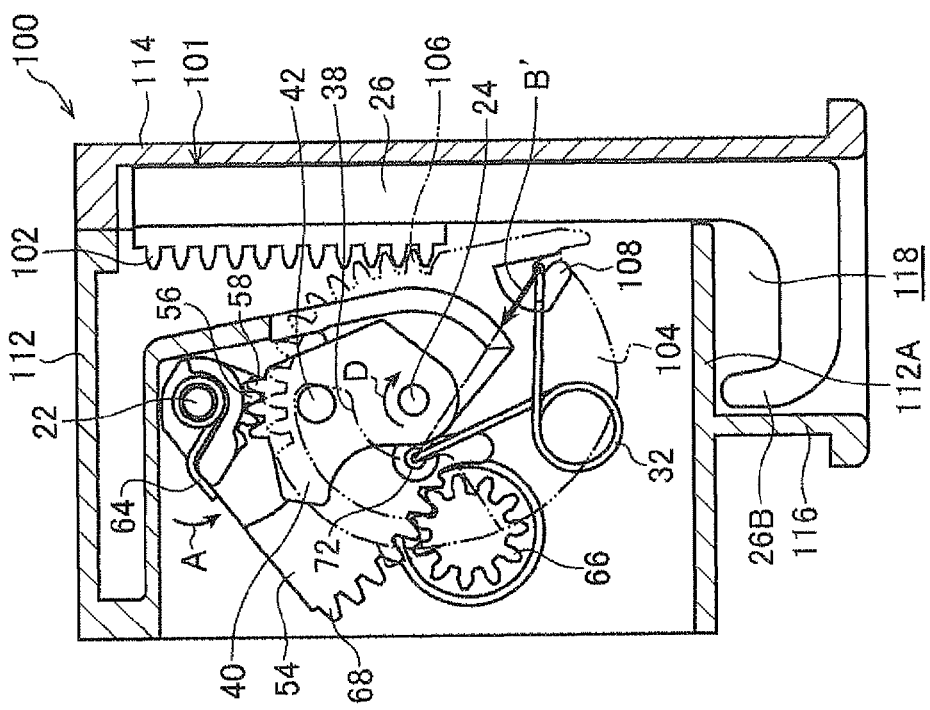
FIG. 14A is a sectional view showing the hook member in a closed position.
Figure 14B:
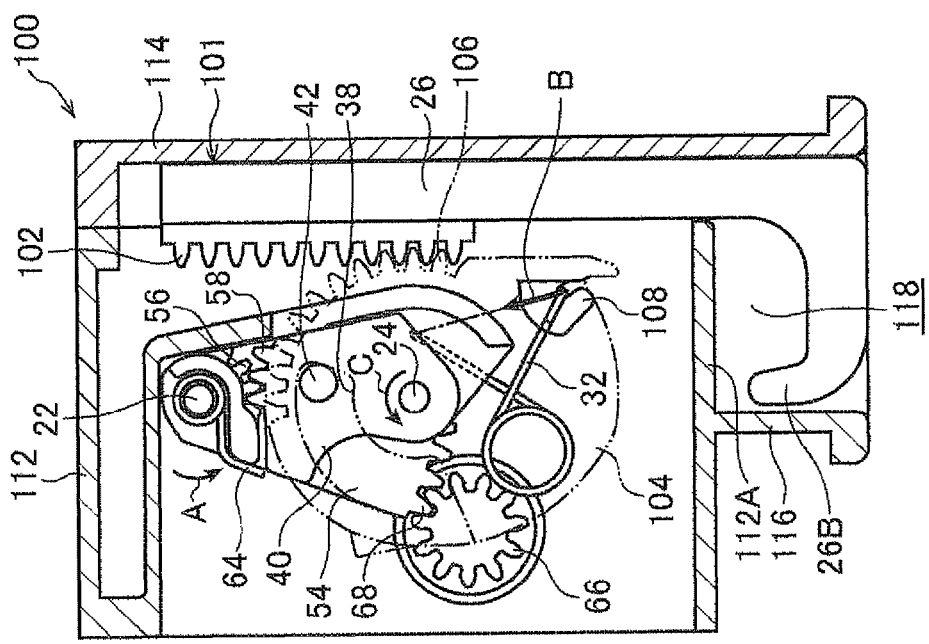
FIG. 14B is a sectional view showing the hook device moved to an engaged position.

A housing wall 116 extends downward from case 14, such that it may house hook portion 26 when hook member 101 is in a closed state (closed position/reference position of hook member 101). As shown in FIG. 14A, when hook member 101 is in a closed position, there is a space 118 between hook portion 26 and a lower side wall 112A of case 112, and as shown in FIG. 14B, hook member 101 may move further in an upward direction, and thereby it is possible to move hook member 101 towards a pushed-in position.

The above embodiments are examples, and as such may be modified as appropriate provided they do not depart from the main purpose of the present invention. Thus, in the present embodiments, although a hook is used as a movable body, the movable body is not limited to a hook, as long as the movable body may move with respect to a case.

A first aspect of the present invention is an operational mechanism for a movable body, including: a movable body, rotatably attached to a support, and rotatable to a pushed-in position, a closed position and an open position; a rotating member, rotatably attached to the support, which rotates due to the movement of the movable body to the pushed-in position; a biasing member, one end of which is attached to the movable body, and the other end of which is attached to the rotating member; and an operation member, which rotates the rotating member, changes the biasing position of the biasing member with respect to the center of rotation of the movable body, and generates in the biasing member a rotational force that moves the movable body to the closed position or the open position.

In the above aspect, a movable body is rotatably attached to a support, and may rotate to a pushed-in position, a closed position and an open position. A rotating member is rotatably attached to the support, and the rotating member rotates by moving the movable body to the pushed-in position. One end of a biasing member is attached to the movable body, and the other end of the biasing member is attached to the rotating member.

By operation of an operation member, the rotating member rotates due to the movement of the movable body to a pushed-in position, which changes a biasing position of the biasing member with respect to the center of rotation of the movable body, and a rotational force that moves the movable body to the closed position or to the open position is generated in the biasing member.

When the center of rotation of the movable body is positioned on a line of action at which the biasing force of the biasing member acts, a moment due to a biasing force of the biasing member does not act on the movable body. However, when the center of rotation of the movable body is not positioned on a line of action at which the biasing force of the biasing member acts, a moment around the center of the movable body is caused by a biasing force of the biasing member acts upon the movable body.

In other words, in the above aspect, a biasing position of a biasing force can be changed, and due to the relationship between the biasing position of the biasing member and the center of rotation of the movable body, the direction of a moment that acts upon the movable body can therefore change, and the movable body can be moved in an opening direction or a closing direction. As a result, following the movable body being in an open state, the movable body can be automatically returned to a closed position.

The second aspect of the present invention is the operational mechanism for a movable body of the first aspect, in which the operation member is a torsion coil spring, one end of which is attached to the support, and the other end of which is attached to the rotating member, which imparts a rotational force to the rotating member.

According to the above aspect, when the movable body is moved to a pushed-in position, the rotating member rotates, and elastic energy is stored in a torsion coil spring. Due to the elastic energy (biasing force) stored in the torsion coil spring, a biasing position of the biasing member with respect to the center of rotation of the movable body changes, and a rotational force that moves the movable body to the closed position or to the open position is generated in the biasing member.

The third aspect of the present invention is the operational mechanism for a movable body of the second aspect in which, when the movable body is at a closed position, a rotational force which is generated by the torsion coil spring and which acts upon the movable body via the rotating member to move the movable body in an opening direction, is in balance with a rotational force which is generated by the biasing member and which acts upon the movable body to move the movable body in a closing direction.

In the above aspect, when the movable body is at a closed position, since a rotational force in an opening direction of the movable body due to the torsion coil spring, and a rotational force in a closing direction of the movable body due to the biasing member are balanced, the movable body is maintained at a closed position.

The fourth aspect of the present invention is the operational mechanism for a movable body of the second aspect in which, when the movable body is at an open position, the rotating member rotates due to the torsion coil spring, and the biasing position of the biasing member moves from a position at which a rotational force that moves the movable body to an open position is generated, to a position at which a straight line that connects biasing positions of the biasing member is superposed with the center of rotation of the movable body.

When the center of rotation of the movable body is positioned on a line of action at which the biasing force of the biasing member acts (a straight line that connects biasing positions of the biasing member), a moment due to a biasing force of the biasing member does not act on the movable body. As a result, in the above aspect, when the movable body is at an open position, the rotating member is rotated by the torsion coil spring, the biasing position of the biasing member is moved to between a position at which a moment in an opening direction of the movable body of is generated, and an intermediary position at which a moment is not generated (a position at which a straight line that connects biasing positions of the biasing member is superposed with the center of rotation of the movable body), and the movable body is maintained in an open state.

The fifth aspect of the present invention is the operational mechanism for a movable body of the fourth aspect, in which, the rotating member rotates due to the torsion coil spring, and the biasing position of the biasing member is moved from a position at which a straight line that connects biasing positions of the biasing member is superposed with the center of rotation of the movable body, to a position at which a rotational force that moves the movable body to a closed position is generated.

According to the above aspect, a rotating member is rotated by a torsion coil spring, and by moving the biasing position of the biasing member from a position at which a line of action at which the biasing force of the biasing member acts and the center of rotation of the movable body are superposed, to a position at which a rotational force that moves the movable body to a closed position is generated, the direction in which the biasing force of the biasing member acts can be changed, taking as a boundary thereof a position at which a moment is not generated with respect to the movable body. Thereby, the movable body can be moved to a closed position.

The sixth aspect of the present invention is the operational mechanism for a movable body of the first aspect, in which the rotating member is further provided with a pushed portion that is pushed by the movable body when the movable body moves from a closed position to a pushed-in position, and that rotates the rotating member.

According to the above aspect, a pushed portion is provided to the rotating member, and when the movable body is moved from a closed position to a pushed-in position, the pushed portion is pushed by the movable body. Thereby, the rotating member rotates.

The seventh aspect of the present invention is the operational mechanism for a movable body of the first aspect, in which the rotating member is provided with a gear portion that engages with a damping gear provided at the support.

According to the above aspect, when the rotating member rotates, a damping force due to the damping gear acts upon the rotating member via the gear portion, and therefore the rotating member moves quietly.

The eighth aspect of the present invention is the operational mechanism for a movable body of the seventh aspect, in which the curvature radius of the gear portion is larger than the curvature radius of the movement locus of the pushed portion.

According to the above aspect, since the curvature radius of the gear portion is configured to be larger than the curvature radius of the movement locus of the pushed portion, the movement amount of the gear portion is larger than that of the pushed portion, and to that extent, the time in which a damping force of the damping gear acts upon the movable body via the rotating member can be lengthened.

The ninth aspect of the present invention is the operational mechanism for a movable body of the first aspect, in which the rotating member is further provided with a first gear member at which a first gear is formed, and which is pushed by the movable body and rotates, when the movable body moves from a closed position to a pushed-in position; and a second gear member provided with a second gear at a center of rotation portion thereof, that engages with the first gear, and the second gear member rotates due to the rotation of the first gear member.

According to the above aspect, a rotating member includes a first gear member and a second gear member. A first gear is formed at the first gear member, which is pushed by the movable body and rotates when the movable body moves from a closed position to a pushed-in position. A second gear member is provided with a second gear at a center of rotation portion thereof, which engages with the first gear, and the second gear member rotates due to the rotation of the first gear member.

In other words, when a movable body moves from a closed position to a pushed-in position, the first gear member is pushed by the movable body and rotates. At this time, the first gear also rotates therewith; consequently, the second gear that engages with the first gear rotates. Thereby, the second gear member rotates.

The tenth aspect of the present invention is the operational mechanism for a movable body of the ninth aspect, provided with a third gear at an outer peripheral portion of the second gear member, and a damping gear provided at the support that engages with the third gear.

According to the above aspect, a third gear is provided at an outer peripheral portion of the second gear member and a damping gear that engages with the third gear is provided at the support. As a result, when the second gear member rotates, a rotational force of the second gear member is damped by the damping gear, and the second gear member moves quietly.

The eleventh aspect of the present invention is the operational mechanism for a movable body of the tenth aspect, in which the curvature radius of the third gear is larger than the curvature radius of the second gear.

According to the above aspect, since the curvature radius of the third gear is larger than the curvature radius of the second gear, the movement amount of the third gear is larger than the movement amount of the second gear, and to that extent, the time in which a damping force of the damping gear acts upon the movable body via the second gear member can be lengthened.

The twelfth aspect of the present invention is the operational mechanism for a movable body of the first aspect, in which the biasing member is a reversing spring provided with a torsion portion at a central portion thereof, and both ends of the reversing spring are biased towards a direction that the both ends of the reversing spring mutually approach each other when the movable body is at an open position or a closed position.

According to the above aspect, the biasing member is a reversing spring provided with a torsion portion at a central portion thereof, in which both ends are biased towards a direction of mutually approaching each other when the movable body is in an open position or a closed position. Thereby, the direction of a biasing force that acts upon a movable body may be changed depending on the positional relationship between the center of rotation of the movable body and the biasing member.

The thirteenth aspect of the present invention is the operational mechanism for a movable body, including a rotating body rotatably attached to a support; a movable body slidably attached to the support and provided with a rack portion that engages with pinion portions provided at the rotating body, and which slides between a pushed-in position, an open position and a closed position; a rotating member, rotatably attached to the support, which rotates via the rotating body due to the movement of the movable body to the pushed-in position; a biasing member, one end of which is attached to the rotating body, and the other end of which is attached to the rotating member; and an operation member that rotates the rotating member, changes the biasing position of the biasing member with respect to the center of rotation of the rotating body, and generates in the biasing member a rotational force that moves the movable body to the closed position or the open position via the rotating body.

According to the above aspect, a rotating body is rotatably attached to a support. A slidable rack portion which engages with pinion portions provided to the rotating body is provided to the movable body. The movable body is slidable between a pushed-in position, a closed position, and an open position. A rotating member is rotatably attached to the support, and rotates via the rotating body due to the movement of the movable body to the pushed-in position.

One end of a biasing member is attached to the rotating body, and the other end of the biasing member is attached to the rotating member. The rotating member is rotated by an operation member, and the biasing position of the biasing member with respect to the center of rotation of the rotating body changes, and a rotational force that moves the movable body from the closed position to the open position via the rotating body is generated in the biasing member.

When the center of rotation of the rotating body is positioned on a line of action at which a biasing force of the biasing member acts, a moment due to the biasing force of the biasing member does not act upon the rotating body. However, when the center of rotation of the rotating body is not on the line of action of the biasing force of the biasing member, a moment around the center of rotation of the rotating body acts on the rotating body due to the biasing force of the biasing member.

In other words, according to the above aspect, the biasing position of the biasing member is changed, and the direction of the moment that acts upon the movable body changes depending on the positional relationship between the center of rotation of the rotating body and the biasing position of the biasing member, and the movable body may be moved in a closing direction or an opening direction via the rotating body. Therefore, it is possible for the movable body to return automatically to a closed position after being in an open state.

The fourteenth aspect of the present invention is the operational mechanism for a movable body of the thirteenth aspect, in which the operation member is a torsion coil spring, one end of which is attached to the support, and the other end is attached to the rotating member, and which imparts rotational force to the rotating member.

According to the above aspect, when the movable body is moved to the pushed-in position, the rotating member rotates, and elastic energy is stored in the torsion coil spring. Due to the elastic energy (biasing force) stored in the torsion coil spring, the biasing position of the biasing member with respect to the center of rotation of the rotating body changes, and a stress that moves the movable body from the closed position to the open position is generated in the biasing member.

The fifteenth aspect of the present invention is the operational mechanism for a movable body, provided with a movable body that moves, with respect to a support, between a reference position and a projecting position, and from the reference position to a predetermined position opposite the projecting position, wherein, due to pushing the movable body from the reference position to the predetermined position, a biasing force of a biasing member is stored, and when the pushing is released, due to the biasing force of the biasing member, the movable body moves to the projecting position and subsequently returns to the reference position.

According to the above aspect, when a movable body at a reference position is pushed to a predetermined position, the movable body moves toward a projecting position, and subsequently, the movable body automatically returns to the reference position due to the biasing force of the biasing member.

The sixteenth aspect of the present invention is the operational mechanism for a movable body of the fifteenth aspect in which, due to a biasing force direction switching mechanism including the biasing member, the movable body moves to a projecting position, and when it arrives at the projecting position, it returns to a reference position.

According to the above aspect, due to a biasing force direction switching mechanism, a biasing force direction of the biasing member may be switched, and a movable body is moved to a projecting position due to the biasing force of the biasing member, and when the movable body arrives at the projecting position, the biasing force direction of the biasing member is switched, and the movable body returns to a reference position due to the biasing force of the biasing member.

The seventeenth aspect of the present invention is the operational mechanism for a movable body of the sixteenth aspect in which, after a fixed period of time after the movable body has arrived at the projecting position, the biasing direction of the biasing member is switched due to the biasing force direction switching mechanism.

According to the above aspect, after a fixed period of time after the movable body has arrived at the projecting position, the biasing force direction of the biasing member changes due to the biasing force direction switching mechanism. If the movable body moves to the projecting position then directly returns to the reference position, it becomes necessary to hold the movable body with the hand while catching clothing or the like thereon. Therefore, when the movable body has arrived at the projecting position, it is maintained at the projecting position for a fixed period of time.

The eighteenth aspect of the present invention is the operational mechanism for a movable body of the eighteenth aspect, in which the biasing force direction switching mechanism includes: a rotating member that moves due to the operation of a rotating body which interlocks with the movable body or is integrated with the movable body; a biasing member provided between the rotating body and the rotating member; and wherein, by pushing the movable body from the reference position to the predetermined position, a virtual line, that connects the acting portions of the biasing force of the biasing member provided between the rotating body and the rotating member, moves to a side opposite the center of rotation of the rotating body, and thereby, the biasing direction of the rotating body is switched, and the movable body moves to the projecting position, after the movable body has moved to the projecting position, the biasing direction of the rotating body is switched by the virtual line moving again to a side opposite the center of rotation of the rotating body.

According to the above aspect, by moving a virtual line, that connects the acting portions of the biasing force of the biasing member, around the center of rotation of the movable body or the rotating body linked to the movable body, the direction of the biasing force of the biasing member that acts upon the movable body or the rotating body is switched. As a result, the movable body moves to a projecting position, and subsequently, the movable body automatically returns to a reference position.

The nineteenth aspect of the present invention is the operational mechanism for a movable body in which the rotating member comprises a small-diameter gear member that is acted upon by the rotating body, and a large-diameter gear member, the movement of which is larger than the small-diameter gear member, that engages with the small-diameter gear member.

According to the above aspect, a small-diameter gear member and a large-diameter gear member are provided to the rotating member, and the small-diameter gear member is acted upon by the rotating body. The large-diameter gear member engages with the small-diameter gear member, and the movement amount is also larger than the small-diameter gear member.

The twentieth aspect of the present invention is the operational mechanism for a movable body of the nineteenth aspect, in which the large-diameter gear member comprises a small-diameter gear provided at a center of rotation thereof that engages with the small-diameter gear member, and a large-diameter gear provided at an outer peripheral portion thereof, wherein due to the large-diameter gear engaging with a damping gear, a biasing direction is switched a fixed period of time after the movable body has arrived at a projecting position.

According to the above aspect, the large-diameter gear member is provided with a small-diameter gear at the center of rotation thereof that engages with the small-diameter gear member, and a large-diameter gear provided at an outer peripheral portion thereof. As a result of the large-diameter gear engaging with the damping gear, the biasing force direction switches after a fixed period of time after the movable body has arrived at the projecting position.

The invention claimed is:

1. An operational mechanism for a movable body, comprising:
    a movable body, rotatably attached to a support, and rotatable to an engaged position, a closed position and an open position;
    a rotating member, rotatably attached to the support, which rotates due to movement of the movable body to the engaged position;
    a biasing member, one end of which is attached to the movable body, and the other end of which is attached to the rotating member; and
    an operation member, which rotates the rotating member, changes a biasing position of the biasing member with respect to a center of rotation of the movable body, and generates in the biasing member a rotational force that moves the movable body to the closed position or the open position,
    wherein the biasing member stores the rotational force to move the movable body toward the open position in the event that the movable body is in the engaged position, and the biasing member stores the rotational force to move the movable body toward the closed position in the event that the movable body is in the open position.

2. The operational mechanism for a movable body of claim 1, wherein the operation member is a torsion coil spring, one end of which is attached to the support, and another end of which is attached to the rotating member, which imparts a rotational force to the rotating member.

3. The operational mechanism for a movable body of claim 2, wherein, when the movable body is at the closed position, a rotational force which is generated by the torsion coil spring and which acts upon the movable body via the rotating member to move the movable body in an opening direction, is in balance with a rotational force which is generated by the biasing member and which acts upon the movable body to move the movable body in a closing direction.

4. The operational mechanism for a movable body of claim 2, wherein, when the movable body is at the open position, the rotating member rotates due to the torsion coil spring, and the biasing position of the biasing member moves from a position at which a rotational force that moves the movable body to the open position is generated, to a position at which a straight line that connects biasing positions of the biasing member is superposed with the center of rotation of the movable body.

5. The operational mechanism for a movable body of claim 4, wherein the rotating member rotates due to the torsion coil spring, and the biasing position of the biasing member is moved from a position at which the straight line that connects biasing positions of the biasing member is superposed with the center of rotation of the movable body, to a position at which a rotational force that moves the movable body to the closed position is generated.

6. The operational mechanism for a movable body of claim 1, wherein the rotating member is further provided with a pushed portion that is pushed by the movable body when the movable body moves from the closed position to the engaged position, and that rotates the rotating member.

7. The operational mechanism for a movable body of claim 1, wherein the rotating member is provided with a gear portion that engages with a damping gear provided at the support.

8. The operational mechanism for a movable body of claim 7, wherein a curvature radius of the gear portion is larger than a curvature radius of a movement locus of a pushed portion.

9. The operational mechanism for a movable body of claim 1, wherein the rotating member is further provided with
    a first gear member at which a first gear is formed, and which is pushed by the movable body and rotates, when the movable body moves from the closed position to the engaged position; and
    a second gear member provided with a second gear at a center of rotation portion thereof, that engages with the first gear, and the second gear member rotates due to the rotation of the first gear member.

10. The operational mechanism for a movable body of claim 9, further provided with a third gear at an outer peripheral portion of the second gear member, and a damping gear that is provided at the support and engages with the third gear.

11. The operational mechanism for a movable body of claim 10, wherein a curvature radius of the third gear is larger than a curvature radius of the second gear.

12. The operational mechanism for a movable body of claim 1, wherein the biasing member is a reversing spring provided with a torsion portion at a central portion thereof, and both ends of the reversing spring are biased towards a direction that the both ends of the reversing spring mutually approach each other when the movable body is at the open position or the closed position.

13. An operational mechanism for a movable body, provided with a movable body that moves, with respect to a support, between a reference position and a projecting position, and from the reference position to a predetermined position opposite the projecting position, wherein,
    due to pushing the movable body from the reference position to the predetermined position, a biasing force toward the projecting position of a biasing member is stored, and when the pushing is released, due to the biasing force of the biasing member, the movable body moves to the projecting position and subsequently returns to the reference position due to a biasing force of the biasing member toward the reference position.

14. The operational mechanism for a movable body of claim 13, wherein, due to a biasing force direction switching mechanism including the biasing member, the movable body moves to the projecting position, and when the movable body arrives at the projecting position, the movable body returns to the reference position.

15. The operational mechanism for a movable body of claim 14, wherein, after a fixed period of time after the movable body has arrived at the projecting position, the biasing direction of the biasing member is switched due to the biasing force direction switching mechanism.

16. The operational mechanism for a movable body of claim 14, wherein the biasing force direction switching mechanism comprises:
   a rotating member that moves due to operation of a rotating body which interlocks with the movable body or is integrated with the movable body;
   the biasing member is provided between the rotating body and the rotating member;
   wherein,
   by pushing the movable body from the reference position to the predetermined position, a virtual line, that connects acting portions of the biasing force of the biasing member, moves to a side opposite a center of rotation of the rotating body, and thereby, the biasing direction of the rotating body is switched, and the movable body moves to the projecting position, after the movable body has moved to the projecting position, the biasing direction of the rotating body is switched by the virtual line moving again to a side opposite the center of rotation of the rotating body.

17. The operational mechanism for a movable body of claim 16, wherein
   the rotating member comprises a first gear member that is acted upon by the rotating body, and a second gear member that engages with the first gear member,
   the second gear member has a radius larger than that of the first gear member, and
   the movement of the second gear member is larger than the first gear member.

18. The operational mechanism for a movable body of claim 17, wherein the second gear member comprises a first gear provided at a center of rotation thereof that engages with the first gear member, and a second gear provided at an outer peripheral portion of the second gear member, wherein due to the second gear engaging with a damping gear, a biasing direction is switched after a fixed period of time after the movable body has arrived at the projecting position.

* * * * *